US011249321B2

(12) United States Patent
Kobayashi

(10) Patent No.: US 11,249,321 B2
(45) Date of Patent: Feb. 15, 2022

(54) DIFFRACTIVE OPTICAL ELEMENT, OPTICAL SYSTEM HAVING THE SAME, AND IMAGING APPARATUS

(71) Applicant: CANON KABUSHIKI KAISHA, Tokyo (JP)

(72) Inventor: Mikio Kobayashi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 583 days.

(21) Appl. No.: 15/730,513

(22) Filed: Oct. 11, 2017

(65) Prior Publication Data

US 2018/0120582 A1 May 3, 2018

(30) Foreign Application Priority Data

Oct. 31, 2016 (JP) .............................. JP2016-213545

(51) Int. Cl.
G02B 5/18 (2006.01)
G02B 27/42 (2006.01)
G02B 27/00 (2006.01)
G02B 13/00 (2006.01)
H04N 5/225 (2006.01)

(52) U.S. Cl.
CPC ........ *G02B 27/4211* (2013.01); *G02B 13/003* (2013.01); *G02B 27/0037* (2013.01); *H04N 5/2254* (2013.01)

(58) Field of Classification Search
CPC ............ G02B 27/4211; G02B 27/0037; G02B 13/003; G02B 15/17; H04N 5/2254
USPC ........................................................ 359/566
See application file for complete search history.

(56) References Cited

U.S. PATENT DOCUMENTS

| 6,829,093 | B1 * | 12/2004 | Nakai | ................. | G02B 5/1876 |
| | | | | | 359/570 |
| 2002/0015231 | A1 * | 2/2002 | Ogawa | ............... | G02B 27/4211 |
| | | | | | 359/566 |
| 2005/0219702 | A1 * | 10/2005 | Nakai | ................. | G02B 5/1814 |
| | | | | | 359/573 |
| 2009/0143560 | A1 * | 6/2009 | Hatanaka | ........... | G02B 27/4211 |
| | | | | | 528/196 |

(Continued)

FOREIGN PATENT DOCUMENTS

JP 2000-321429 A 11/2000
JP 2008-083096 A 4/2008
(Continued)

*Primary Examiner* — Stephone B Allen
*Assistant Examiner* — Jyotsna V Dabbi
(74) *Attorney, Agent, or Firm* — Canon U.S.A., Inc. IP Division

(57) ABSTRACT

A diffractive optical element includes a first lens having a convex surface, a second lens having a concave surface, disposed in such a manner that the concave surface of the second lens faces the convex surface of the first lens, and a diffraction grating section formed between the first and the second lenses and having positive optical power through diffraction. The diffraction grating section includes a first diffraction grating and a second diffraction grating disposed in this order from a side closer to the first lens; the second diffraction grating has a refractive index larger than that of the first diffraction grating, and an inner diameter of a grating wall surface of the diffraction grating section decreases as approaching to the second lens from the first lens.

14 Claims, 20 Drawing Sheets

(56) References Cited

U.S. PATENT DOCUMENTS

| 2011/0013284 A1* | 1/2011 | Ushigome | G02B 5/188 |
| | | | 359/576 |
| 2012/0120494 A1* | 5/2012 | Takayama | G02B 5/1823 |
| | | | 359/576 |
| 2012/0229921 A1 | 9/2012 | Eguchi | |

FOREIGN PATENT DOCUMENTS

| JP | 2008-170594 A | 7/2008 |
| JP | 2011-170028 A | 9/2011 |
| JP | 2013-064858 A | 4/2013 |

\* cited by examiner

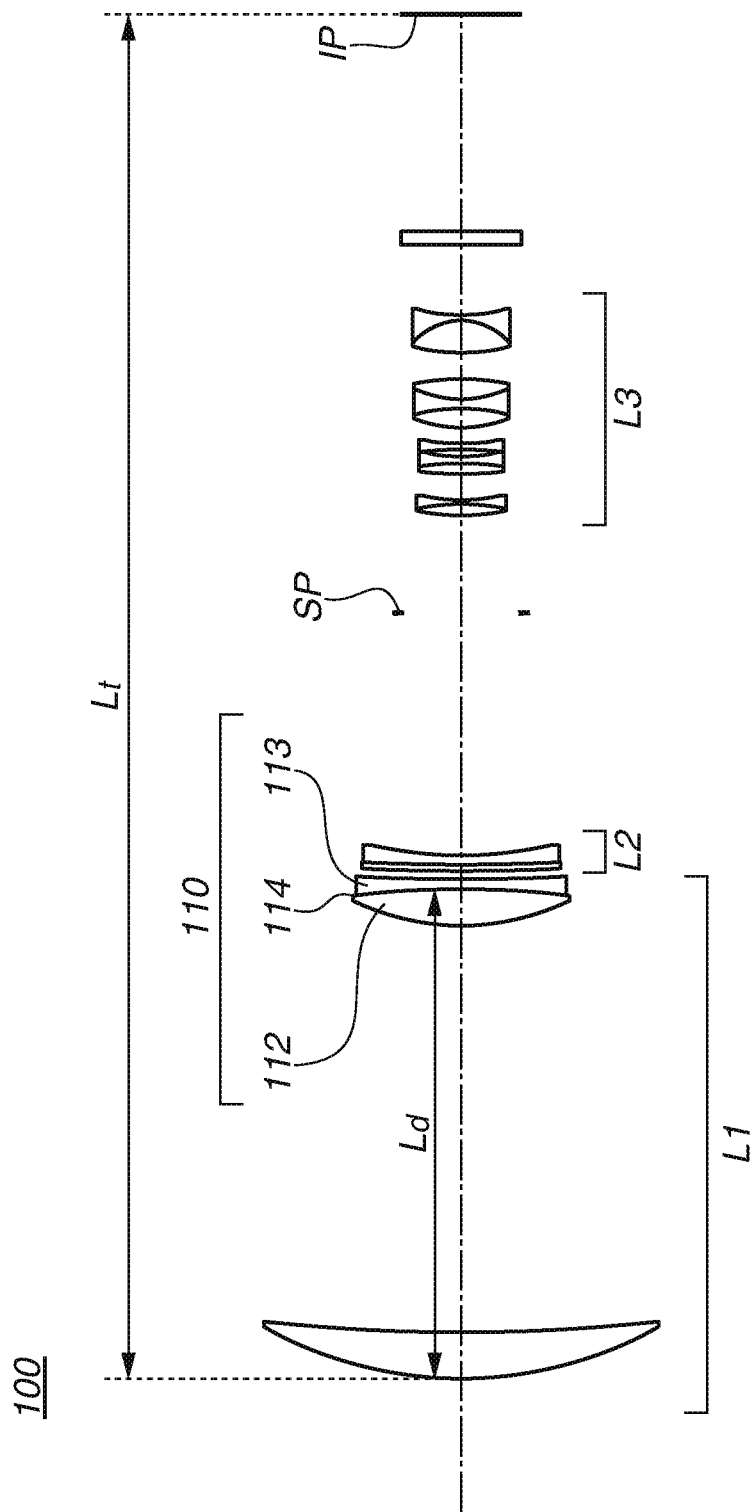

DIFFRACTIVE OPTICAL ELEMENT, OPTICAL SYSTEM HAVING THE SAME, AND IMAGING APPARATUS

BACKGROUND OF THE INVENTION

Field of the Invention

The present invention relates to a diffractive optical element used for an optical system such as a digital camera.

Description of Related Art

A diffractive optical element having a saw-tooth diffraction grating is known as an optical element used to reduce the chromatic aberration of an optical system. When a diffractive optical element is used for the optical system, it is important to reduce flare arising when light is reflected or refracted by a wall surface of the diffraction grating.

Japanese Patent Application Laid-Open No. 2008-170594 discusses a technique for reducing flare by forming a diffractive optical element in such a manner that a grating wall surface of the diffractive optical element becomes parallel with incident light.

SUMMARY OF THE INVENTION

According to an aspect of the present invention, a diffractive optical element includes a first lens having a convex surface, a second lens having a concave surface, disposed in such a manner that the concave surface of the second lens faces the convex surface of the first lens, and a diffraction grating section formed between the first and the second lenses and having positive optical power through diffraction, wherein the diffraction grating section includes a first diffraction grating and a second diffraction grating disposed in this order from a side closer to the first lens, the second diffraction grating having a larger refractive index than the first diffraction grating, and wherein an inner diameter of an arbitrary grating wall surface of the diffraction grating section decreases as approaching to the second lens from the first lens.

According to an aspect of the present invention, a diffractive optical element includes a first lens having a convex surface, a second lens having a concave surface, disposed in such a manner that the concave surface of the second lens faces the convex surface of the first lens, and a diffraction grating section formed between the first and the second lenses and having positive optical power through diffraction, wherein the diffraction grating section includes a first diffraction grating and a second diffraction grating disposed in this order from a side closer to the first lens, the second diffraction grating having a larger refractive index than the first diffraction grating, and wherein the following conditional expression is satisfied:

$$\theta_H \times \theta_M < 0$$

where $\theta_H$ is an angle formed by an arbitrary grating wall surface and an optical axis, and $\theta_M$ is an angle formed by the optical axis and a normal to an enveloping surface of the first diffraction grating, the enveloping surface formed by connecting apical portions of the first diffraction grating, at a position where the arbitrary grating wall surface contacts the enveloping surface, wherein the angle is negative when measured in the clockwise direction with respect to the optical axis, and positive when measured in the counterclockwise direction with respect to the optical axis, such that angles $\theta_H$ and $\theta_M$ have different signs.

Further features of the present invention will become apparent from the following description of exemplary embodiments with reference to the attached drawings.

BRIEF DESCRIPTION OF THE DRAWINGS

FIG. 4 is a cross-sectional view illustrating an optical system according to a second exemplary embodiment in a state of being focused at infinity.

DESCRIPTION OF THE EMBODIMENTS

Exemplary embodiments of the present invention will be described below.

Figure 1A:
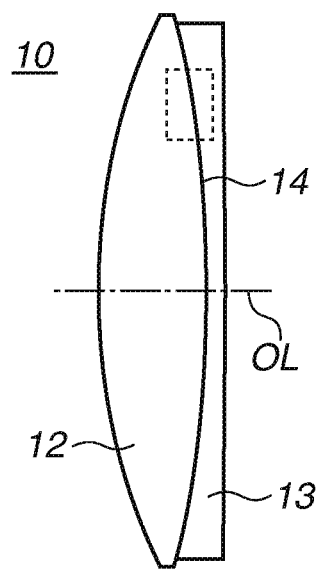
FIGS. 1A and 1B are schematic views illustrating a diffractive optical element according to a first exemplary embodiment.
Figure 1B:
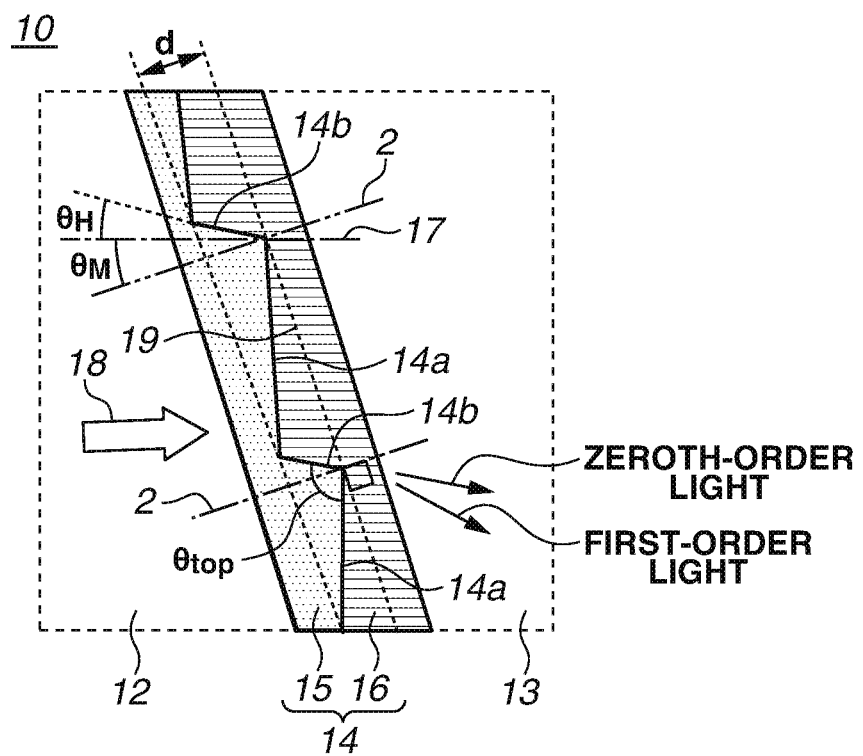

FIGS. 1A and 1B are schematic views illustrating a diffractive optical element (hereinafter, referred to as a DOE) according to a first exemplary embodiment.

FIG. 1A is a cross-sectional view illustrating a DOE 10 according to the present exemplary embodiment. As illustrated in FIG. 1A, the DOE 10 according to the present exemplary embodiment has a first lens 12 and a second lens 13. The first lens 12 has a convex surface, and the second lens 13 has a concave surface. The second lens 13 is disposed in such a manner that the concave surface of the second lens 13 faces the convex surface of the first lens 12. The first lens 12 has an optical axis OL.

A diffraction grating section 14 is formed between the first lens 12 and the second lens 13 in a space where the concave surface of the second lens 13 faces the convex surface of the first lens 12. When the DOE 10 is used for an optical system, the DOE 10 is disposed in such a manner that the first lens 12 is disposed on the object side of the second lens 13. More specifically, incident light enters the DOE 10 from the side of the first lens 12, such that the incident light is diffracted by the diffraction grating section 14.

FIG. 1B is an enlarged view illustrating the portion enclosed in dotted lines illustrated in FIG. 1A. In the DOE 10 according to the present exemplary embodiment, the diffraction grating section 14 is formed of a first diffraction grating 15 and a second diffraction grating 16 which are closely stacked in this order from the side of the first lens 12 to the second lens 13. The interface between the first diffraction grating 15 and the second diffraction grating 16 has a saw-tooth shape (sawtooth profile), where a grating surface 14a and a grating wall surface 14b are alternately formed.

Both of the first diffraction grating 15 and the second diffraction grating 16 are concentrically shaped centered on the optical axis OL. A lens action can be given to the diffraction grating section 14 by changing the grating pitch (distance between adjoining grating wall surfaces 14b) of the first diffraction grating 15 and the second diffraction grating 16. In the DOE 10 according to the present exemplary embodiment, the optical power by the diffraction of the diffraction grating section 14 is positive.

Figure 20:
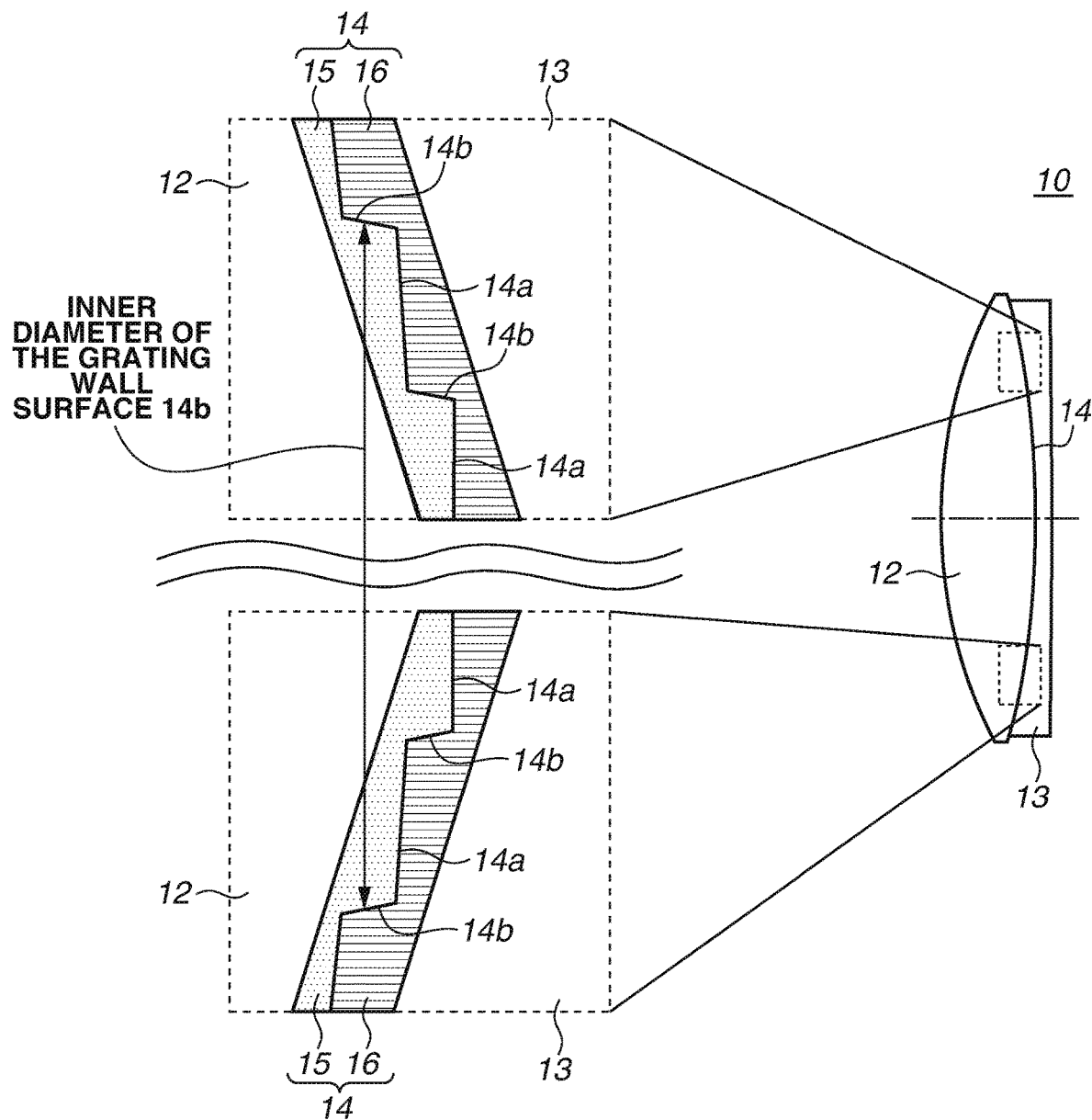
FIG. 20 is a schematic view illustrating an inner diameter of a grating wall surface.

Now, the grating wall surface 14b of the diffraction grating section 14 will be described. As illustrated in FIG. 1B, the grating wall surface 14b is shaped to be inclined relative to a straight line 17 parallel to the optical axis OL. That is, the grating wall surface 14b of the diffractive optical element 10 is not parallel to the optical axis OL. More specifically, the grating wall surface 14b is inclined in such a manner that the inner diameter of the grating wall surface 14b gradually decreases as the grating wall surface 14b goes from a point on the first lens 12 to a point on the second lens 13, as shown in FIG. 20. The grating wall surface of which inner diameter is illustrated in FIG. 20 is a rotationally symmetric surface with respect to the optical axis. The grating wall surface of which inner diameter is illustrated in FIG. 20 can be also said to be a part of a conical surface formed about the optical axis as a rotational axis.

From another viewpoint, the grating wall surface 14b satisfies the following formula (1).

$$\theta_H \times \theta_M < 0 \quad (1)$$

where $\theta_H$ is the angle formed by the grating wall surface 14b and the optical axis OL, and $\theta_M$ is the angle formed by the optical axis OL and a normal 2 to an enveloping surface 19 of the first grating (the enveloping surface is formed by connecting apical portions of the first diffraction grating 15) at the position where the grating wall surface 14b contacts the enveloping surface 19.

Referring to the formula (1), the angle is negative when measured in the clockwise direction with respect to the optical axis, and positive when measured in the counterclockwise direction with respect to the optical axis. Formula (1) means that angles $\theta_H$ and $\theta_M$ have different signs.

Inclining the grating wall surface 14b with respect to the optical axis OL in this manner enables reducing the angle formed by incident light 18 and the grating wall surface 14b when the incident light 18 enters the diffraction grating section 14 as convergence light from the side of the first lens 12. This enables reducing the amount of light incident on the grating wall surface 14b out of the incident light 18 and reducing flare generation caused by the grating wall surface 14b.

Next, the diffraction efficiency of light in the diffraction grating section 14 of the DOE 10 will be described.

The condition under which the diffraction efficiency of the m-th order diffraction light in the DOE 10 is maximized is given by the formula (2).

$$\varphi(\lambda) = (N_R(\lambda) - N_L(\lambda)) \times d = m\lambda \quad (2)$$

where $\lambda$ is the wavelength, $N_L(\lambda)$ is the refractive index of the first diffraction grating 15, and $N_R(\lambda)$ is the refractive index of the second diffraction grating 16.

$\varphi(\lambda)$ denotes the optical path length difference in the diffraction grating section 14. d denotes the distance between the enveloping surface 19 of the apical portions of the first diffraction grating 15 and the enveloping surface of the apical portions of the second diffraction grating 16, and is equivalent to the grating height of the diffraction grating section 14. Referring to the formula (2), m denotes the diffraction order represented by an arbitrary integral value. The diffraction order of the diffraction light diffracted in the direction toward the optical axis with respect to the 0th order diffraction light is positive, and the diffraction order of the diffraction light diffracted in the direction away from the optical axis with respect to the 0th order diffraction light is negative.

Referring to the formula (2), forming the first diffraction grating 15 and the second diffraction grating 16 by using materials having different refractive indices and suitably designing the grating height d enable improving the diffraction efficiency at an arbitrary wavelength. To improve the diffraction efficiency in a wider wavelength band, it is necessary to form the diffraction grating section 14 by combining a material having a relatively high refractive index and low dispersion with a material having a relatively low refractive index and high dispersion.

From the viewpoint of improving the diffraction efficiency, whichever the first diffraction grating 15 or the second diffraction grating 16 in the diffraction grating section 14 may be provided with a relatively high refractive index. However, in the DOE 10 according to the present exemplary embodiment, the refractive index of the second diffraction grating 16 is made larger than the refractive index of the first diffraction grating 15 to facilitate the manufacturing of the DOE 10 while reducing flare generation. The configuration of the present invention will be described below with reference to a comparative example.

When positive optical power is given to the diffraction grating section 14, the inclination of the grating surface 14a is determined by the magnitude relationship between the refractive indices of the first diffraction grating 15 and the second diffraction grating 16. When the refractive index of the second diffraction grating 16 is made larger than the refractive index of the first diffraction grating 15, the grating surface 14a of the diffraction grating section 14 having positive optical power has a shape as illustrated in FIG. 1B.

The grating wall surface 14b of the diffraction grating section 14 has a shape inclined relative to the optical axis as described above to reduce flare. Therefore, as illustrated in FIG. 1B, an angle $\theta_{top}$ formed by the grating wall surface 14b and the grating surface 14a can be increased to enable easily forming the first diffraction grating 15 and the second diffraction grating 16.

Although a diffraction grating is generally manufactured by forming resin using a mold, the DOE 10 according to the present exemplary embodiment illustrated in FIG. 1B is shaped to minimize interference between the mold and the diffraction grating when the mold is released by moving in the direction parallel to the optical axis. Therefore, a mold releasing process in the manufacturing of the DOE 10 can be performed easily.

Figure 2A:
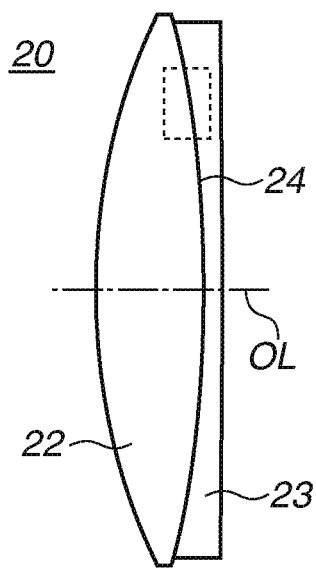
FIGS. 2A, 2B, and 2C are schematic views illustrating a diffractive optical element according to a first comparative example.
Figure 2B:
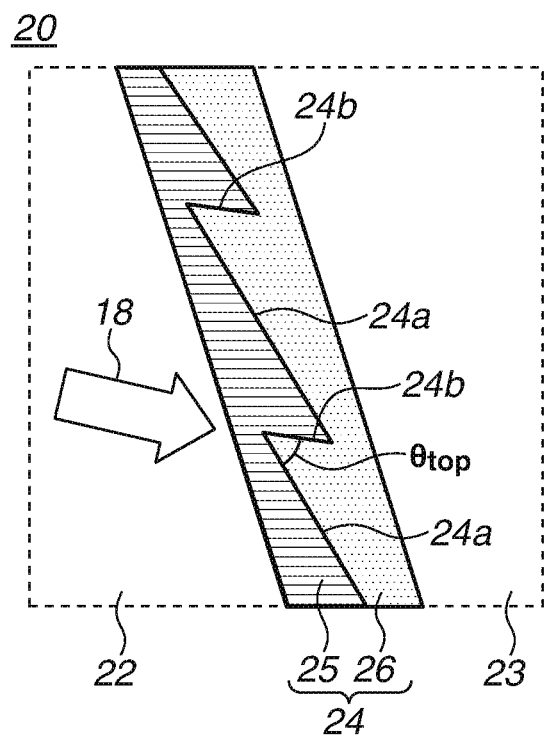
Figure 2C:
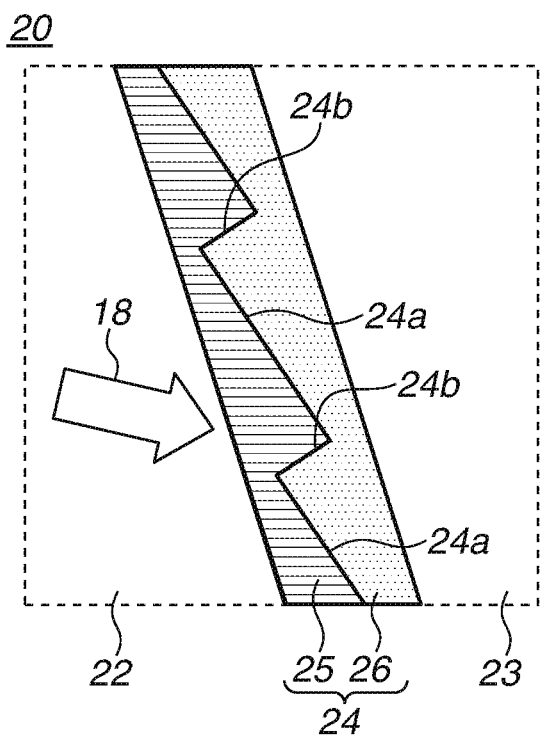

FIGS. 2A to 2C are schematic views illustrating a DOE 20 according to a first comparative example. Similar to the DOE 10 according to the first exemplary embodiment, the DOE 20 according to the first comparative example is formed of a first lens 22 having a convex surface, a second lens 23 having a concave surface facing the convex surface of the first lens 22, and a diffraction grating section 24 formed between the first lens 22 and the second lens 23.

FIG. 2A is a side view illustrating the DOE 20 according to the first comparative example. FIG. 2B is an enlarged view illustrating a cross-section of the area drawn by broken lines illustrated in FIG. 2A. In the DOE according to the first comparative example, the diffraction grating section 24 is formed of the first diffraction grating 25 and the second diffraction grating 26 stacked in this order from the side closer to the first lens 22. The diffraction grating section 24 of the DOE 20 has positive optical power like the DOE 10 according to the first exemplary embodiment. The DOA 20 differs from the DOE 10 according to the first exemplary embodiment in that the refractive index of the second diffraction grating 26 is made smaller than the refractive index of the first diffraction grating 25. That is, in the comparative example, the refractive index of the second diffraction grating 26 is made smaller than the refractive index of the first diffraction grating 25. Therefore, the inclination of the grating surface 24a in the DOE 20 according to the first comparative example is inclined in the direction opposite to the grating surface 14a of the DOE 10 according to the first exemplary embodiment.

In the DOE 20 according to the first comparative example, similar to the DOE 10 according to the first exemplary embodiment, the grating wall surface 24b is inclined to decrease the angle formed by the incident light and the grating wall surface 24b. However, as illustrated in FIG. 2B, the angle $\theta_{top}$ formed by the grating surface 24a and the grating wall surface 24b of the DOE 20 is smaller than $\theta_{top}$ of the DOE 10 according to the first exemplary embodiment. As understood from FIG. 2B, when the first diffraction grating 25 or the second diffraction grating 26 is formed of the DOE 20 using a mold, the shape of the grating (25 or 26) will prevent easy separation between the diffraction grating and the mold when the mold is released in the direction parallel to the optical axis. Accordingly, the DOE 20 is more difficult to manufacture than the DOE 10.

On the other hand, in the DOE 20 according to the first comparative example, when the grating wall surface 24b is inclined as illustrated in FIG. 2C to prevent interference between the mold and the diffraction grating, mold release operations could be improved but the angle formed by the incident light 18 and the grating wall surface 24b will increase. As a result, the amount of light incident on the grating wall surface 24b increases, and notable flare is generated.

Figure 3A:
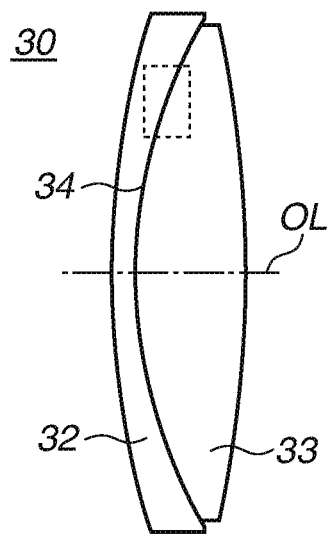
FIGS. 3A, 3B, and 3C are schematic views illustrating a diffractive optical element according to a second comparative example.

A case where the shapes of the first and the second lenses are different from those in the DOE 10 with reference to a second comparative example. FIG. 3A is a cross-sectional view illustrating a DOE 30 according to the second comparative example. The DOE 30 according to the second comparative example includes a first lens 32 having a concave surface, a second lens 33 having a convex surface facing the concave surface of the first lens 32, and a diffraction grating section 34 formed between the first lens 32 and the second lens 33. The diffraction grating section 34 includes a first diffraction grating 35 and a second diffraction grating 36 stacked in this order from the side closer to the first lens 32. Similar to the DOE according to the first exemplary embodiment, the diffraction grating section 34 of the DOE 30 has positive optical power.

Figure 3B:
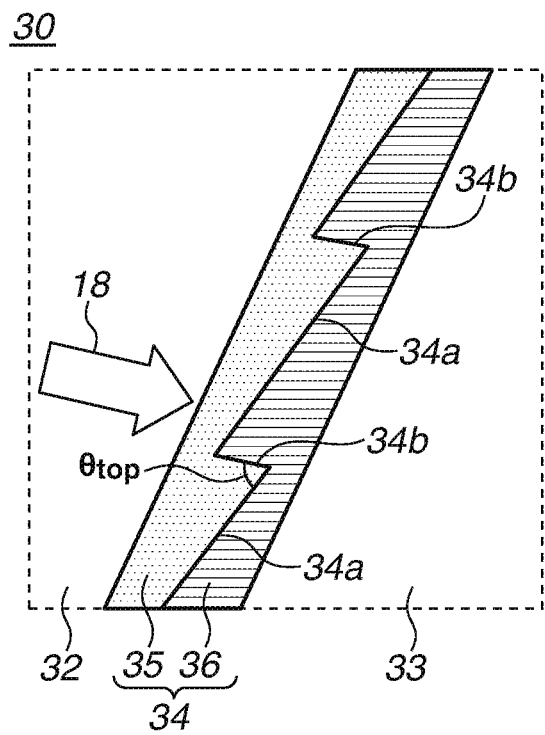

FIG. 3B is an enlarged view illustrating the area enclosed by dotted lines illustrated in FIG. 3A when the refractive index of the second diffraction grating 36 is made larger than the refractive index of the first diffraction grating 35 in the DOE 30. Similar to the DOE 10 according to the first exemplary embodiment, also in the DOE 30 according to the second comparative example, the grating wall surface 34b is inclined to decrease the angle formed by the incident light 18 and the grating wall surface 34b. Therefore, flare caused by the grating wall surface 34b can also be reduced in the DOE 30.

However, as illustrated in FIG. 3B, the angle $\theta_{top}$ formed by the grating surface 34a and the grating wall surface 34b of the DOE 30 is smaller than $\theta_{top}$ of the DOE 10 according to the first exemplary embodiment. Therefore, the DOE 30 is more difficult to manufacture than the DOE 10.

Figure 3C:
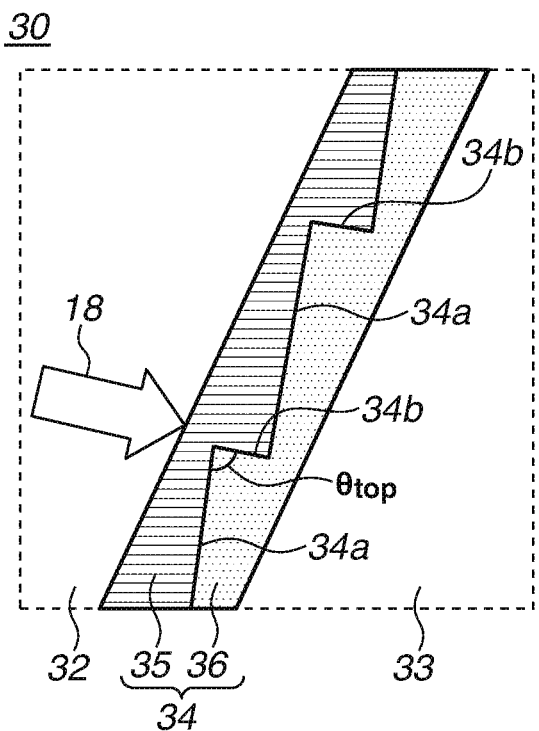

FIG. 3C is an enlarged view illustrating the area enclosed by dotted lines illustrated in FIG. 3A when the refractive index of the first diffraction grating 35 is made larger than the refractive index of the second diffraction grating 36 in the DOE 30. In this case, the angle $\theta_{top}$ formed by the grating surface 34a and the grating wall surface 34b can be made larger than $\theta_{top}$ in the case illustrated in FIG. 3B. However, in the configuration illustrated in FIG. 3C, the shape of the DOE 30 will cause interference between the diffraction grating and the mold when the mold for forming the first diffraction grating 35 or the second diffraction grating 36 is released in the direction parallel to the optical axis. Therefore, the DOE 30 is more difficult to manufacture than the DOE 10.

As described above, unlike the DOE 20 according to the first comparative example and the DOE 30 according to the second comparative example, the DOE 10 according to the first exemplary embodiment can be easily manufactured while reducing flare generation. In the diffraction grating section 14 having positive optical power formed on a curved surface having a center of curvature on the light incident side, the grating wall surface 14b is inclined in such a manner that the refractive index of the second diffraction grating 16 is made larger than the refractive index of the first diffraction grating 15 and accordingly the angle formed by the grating wall surface 4b and the incident light decreases.

To facilitate the manufacturing of the DOE 10 while reducing flare generation, it is desirable that the inner diameter of the grating wall surface 14b gradually decreases as the grating wall surface 14b comes closer from the first lens 12 to the second lens 13 with at least 50 percent of all the annulars of the diffraction grating section 14. It is more desirable that the inner diameter of the grating wall surface 14b gradually decreases as the grating wall surface 14b comes closer from the first lens 12 to the second lens 13 with at least 70 percent of all the annulars of the diffraction grating section 14, still more desirably, with all of the annulars of the diffraction grating section 14.

From another viewpoint, to facilitate the manufacturing of the DOE 10 while reducing flare generation, it is desirable that the grating wall surface 14b is inclined to satisfy the formula (1) with at least 50 percent of all the annulars of the diffraction grating section 14. It is more desirable that the grating wall surface 14b is inclined to satisfy the formula (1) with at least 70 percent of all the annulars of the diffraction grating section 14, still more desirably, with all of the annulars of the diffraction grating section 14.

With the DOE 10, it is desirable that the first lens 12 is a positive lens. A positive lens refers to a convex lens of which the thickness decreases with increasing distance from the optical axis. As described above, the first lens 12 has a convex surface. Therefore, when a negative lens is used as the first lens 12, the absolute value of the curvature of the lens surface of the first lens 12 on the side where the diffraction grating section 14 is not formed will be too large. In this case, the amount of aberration on the lens surface of the first lens 12 on the side where the diffraction grating section 14 is not formed will increase.

With the DOE 10, it is desirable that the second lens 13 is a negative lens. A negative lens refers to a concave lens of which the thickness increases with increasing distance from the optical axis. As described above, the second lens 13 has a concave surface. Therefore, when a positive lens is used as the second lens 13, the absolute value of the curvature of the lens surface of the second lens 13 on the side where the diffraction grating section 14 is not formed will be too large. In this case, the amount of aberration on the lens surface of the second lens 13 on the side where the diffraction grating section 14 is not formed will increase.

It is desirable that the following conditional expression (3) is satisfied.

$$20 < \upsilon_{LL} - \upsilon_{LR} < 60 \quad (3)$$

where $\upsilon_{LL}$ is the Abbe number of the first lens 12, and $\upsilon_{LR}$ is the Abbe number of the second lens 13.

The Abbe number $\upsilon_d$ is given by $\upsilon_d = (N_d - 1)/(N_F - N_C)$, where $N_g$, $N_F$, $N_d$, and $N_C$ are refractive indices for the Fraunhofer g line (435.8 nm), F line (486.1 nm), d line (587.6 nm), and C line (656.3 nm), respectively.

When the difference between $\upsilon_{LL}$ and $\upsilon_{LR}$ is small, to sufficiently correct the chromatic aberration by using the DOE 10, it is necessary to increase the absolute value of the curvature of the lens surfaces of the first lens 12 and the second lens 13 on the sides where the diffraction grating section 14 is formed. When the difference between $\upsilon_{LL}$ and $\upsilon_{LR}$, $(\upsilon_{LL} \times \upsilon_{LR})$, falls below the lower limit of the formula (3), the absolute values of the curvatures of the lens surfaces of the first lens 12 and the second lens 13 on the sides where the diffraction grating section 14 is formed will be too large, and the incident angle of light incident on the diffraction grating section 14 will be too large. In this case, the amount of light incident on the grating wall surface 14b increases, making it difficult to sufficiently reduce flare.

On the other hand, when the difference between $\upsilon_{LL}$ and $\upsilon_{LR}$, $(\upsilon_{LL} - \upsilon_{LR})$, exceeds the upper limit of the formula (3), the curvatures of the lens surfaces of the first lens 12 and the second lens 13 on the sides where the diffraction grating section 14 is formed will be too small, making it difficult to correct the spherical aberration.

It is desirable that the range of the formula (3) is set within the range of the following formula (3a), more desirably, set within the range of the formula (3b).

$$27 < \upsilon_{LL} - \upsilon_{LR} < 55 \quad (3a)$$

$$30 < \upsilon_{LL} - \upsilon_{LR} < 53 \quad (3b)$$

It is desirable that the following formula (4) is satisfied.

$$0.8 < N_L/N_{LL} < 1.2 \quad (4)$$

where $N_{LL}$ is the refractive index of the first lens 12 for the d line, and $N_L$ is the refractive index of the first diffraction grating 15 for the d line.

When $N_L$ is smaller than $N_{LL}$, the interface between the first lens 12 and the first diffraction grating 15 has positive refractive power. When $N_L$ is smaller than $N_{LL}$ to such an extent that $N_L/N_{LL}$ falls below the lower limit of the formula (4), light that entered the DOE 10 is largely diffracted at the interface between the first lens 12 and the first diffraction grating 15. As a result, the incident angle of light incident on the diffraction grating section 14 will be too large. In this case, the amount of light incident on the grating wall surface 14b increases, making it difficult to sufficiently reduce flare.

On the other hand, when the refractive index $N_L$ of the first diffraction grating 15 is larger than the refractive index $N_{LL}$ of the first lens 12 to such an extent that $N_L/N_{LL}$ exceeds the upper limit of the formula (4), the range of options for the materials to be used for the first diffraction grating 15 and the second diffraction grating 16 will be narrowed. As a result, it becomes difficult to acquire high diffraction efficiency in a wide wavelength range.

It is desirable that the range of the formula (4) is set within the range of the following formula (4a).

$$0.9 < N_L/N_{LL} < 1.1 \quad (4a)$$

The angle formed by the arbitrary grating wall surface 14b and the surface normal 2 of an enveloping surface 19 (formed by connecting apical portions of the first diffraction grating 15) at the position where the grating wall surface 14b contacts the enveloping surface 19 has an absolute angle value $\theta_{HM}$. In this case, it is desirable that the following conditional expression (5) is satisfied.

$$5 \text{ degrees} < \Delta\theta_{HM} < 45 \text{ degrees} \quad (5)$$

where $\Delta\theta_{HM}$ is the absolute value of the difference between the maximum and the minimum values of $\theta_{HM}$ in the diffraction grating section 14.

A decrease in the value of the formula (5), $\Delta\theta_{HM}$, is equivalent to an increase in the curvature radius of the lens surfaces of the first lens 12 and the second lens 13 on the sides where the diffraction grating section 14 is formed. When the curvature radii of the lens surfaces of the first lens 12 and the second lens 13 on the sides where the diffraction grating section 14 is formed are large to such an extent that $\Delta\theta_{HM}$ falls below the lower limit of the formula (5), it becomes difficult to correct aberrations such as the spherical aberration.

On the other hand, when the curvature radii of the lens surfaces of the first lens 12 and the second lens 13 on the sides where the diffraction grating section 14 is formed are small to such an extent that $\Delta\theta_{HM}$ exceeds the upper limit of the formula (5), the incident angle of light incident on the diffraction grating section 14 will be too large. In this case, it becomes difficult to reduce flare generation in the diffraction grating section 14.

It is desirable that the range of the value of the formula (5) is set within the range of the following formula (5a).

$$10 \text{ degrees} < \Delta\theta_{HM} < 40 \text{ degrees} \qquad (5a)$$

It is desirable that at least one of the first diffraction grating 15 and the second diffraction grating 16 is formed of resin. Since it is easy to form resin by using a mold, forming at least one of the first diffraction grating 15 and the second diffraction grating 16 with resin facilitates the forming of the diffraction grating section 14.

Although, in the DOE 10 illustrated in FIGS. 1A and 1B, the first diffraction grating 15 and the second diffraction grating 16 are closely bonded at the diffraction grating section 14, a thin film may be formed between the first diffraction grating 15 and the second diffraction grating 16. For example, a thin film may be formed only at the grating wall surface 14b, or a thin film may be formed at both of the grating surface 14a and the grating wall surface 14b. When a thin film is formed at the portion equivalent to the grating surface 14a illustrated in FIG. 1B, the grating surface 14a serves as the interface between the first diffraction grating 15 and the thin film. When a thin film is formed at the portion equivalent to the grating wall surface 14b illustrated in FIG. 1B, the grating wall surface 14b serves as the interface between the first diffraction grating 15 and the thin film.

Optical systems according to second to sixth exemplary embodiments of the present invention will be described below.

An optical system according to each exemplary embodiment is an imaging optical system used for an imaging apparatus such as a video camera, digital still camera, and silver-halide film camera.

An optical system according to the second exemplary embodiment will be described below. FIG. 4 is a cross-sectional view illustrating an optical system 100 according to the second exemplary embodiment in a state of focusing at infinity. Referring to FIG. 4, the left side is the object side, and the right side is the image side. The optical system 100 includes a first lens group L1 having positive refractive power, a second lens group L2 having negative refractive power, an aperture diaphragm SP, and a third lens group L3 having negative refractive power, which are disposed in this order from the object side to the image side. In focusing from infinity to the shortest distance, the second lens group L2 moves to the image side. The first lens group L1 and the third lens group L3 do not move while focusing.

FIG. 4 includes an image plane (IP). When using the optical system 100 as the imaging optical system of a digital camera, a solid-state image sensor such as a complementary metal-oxide semiconductor (CMOS) sensor or charge-coupled device (CCD) sensor is disposed on the image plane IP. When the optical system 100 is used as the imaging optical system of a silver-halide film camera, the image plane IP is equivalent to a film plane.

The first lens group L1 includes a DOE 110 arranged on the image side of one or more lenses. Using the DOE 110 as an optical system enables suitably correcting aberrations such as the chromatic aberration.

As illustrated in FIG. 4, the DOE 110 includes a first lens 112 having a convex surface on the image side, and a second lens 113 having a concave surface on the object side. A diffraction grating section 114 is formed between the first lens 112 and the second lens 113. In the optical system 100, the DOE 110 is disposed in such a manner that the first lens 112 is disposed on the object side of the second lens 113.

The configuration of the diffraction grating section 114 is similar to the configuration of the DOE 10 according to the first exemplary embodiment. More specifically, the diffraction grating section 114 includes a first diffraction grating and a second diffraction grating having a larger refractive index than the first diffraction grating in this order from the first lens 112. The optical power by the diffraction of the diffraction grating section 114 is positive.

Each grating wall surface of the diffraction grating section 114 is inclined relative to the optical axis in such a manner that the inner diameter of the grating wall surface gradually decreases as the grating wall surface comes closer from the first lens 112 to the second lens 113. From another viewpoint, the grating wall surface of the diffraction grating section 114 is inclined to satisfy the formula (1).

Figure 5:
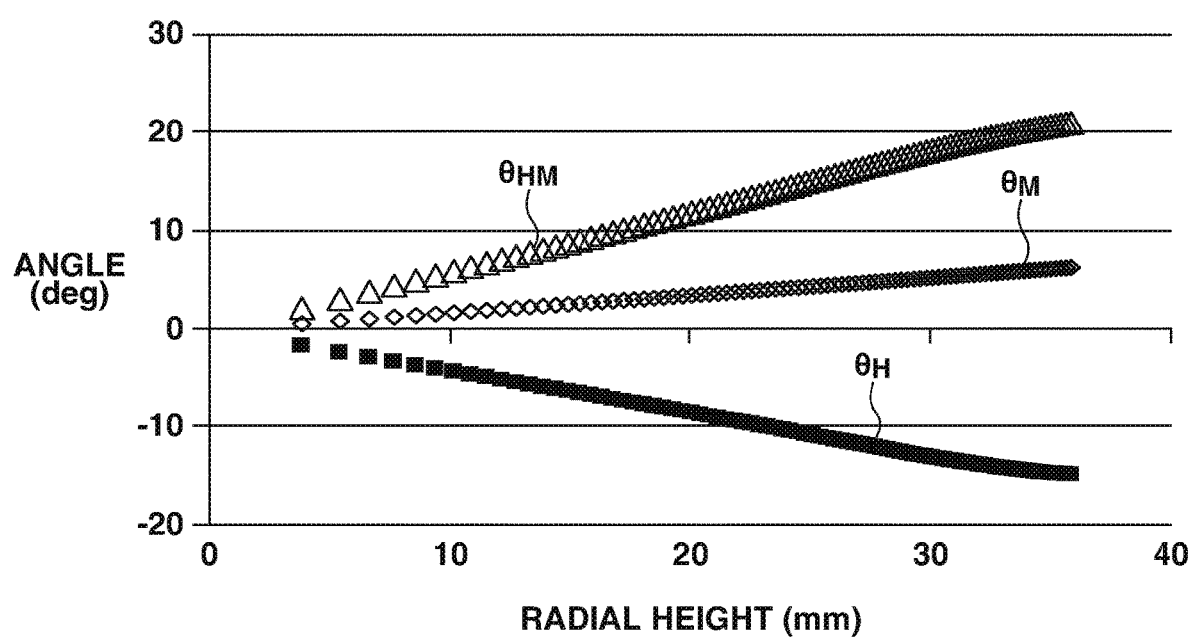
FIG. 5 illustrates $\theta_M$, $\theta_H$, and $\theta_{HM}$ in a diffractive optical element of the optical system according to the second exemplary embodiment.

For each grating wall surface of the diffraction grating section 114 of the DOE 110, relations between the distance from the grating wall surface to the optical axis, and respective $\theta_H$ (degrees), $\theta_M$ (degrees), and $\theta_{HM}$ (degrees) are illustrated in FIG. 5. Referring to the cross-sectional view of the optical system 100 illustrated in FIG. 4, the shape of the diffraction grating section 114 is symmetric with respect to the optical axis. FIG. 5 illustrates the relations only for the upper side of the optical axis. $\theta_H$ and $\theta_M$ are positive when measured in the counterclockwise direction with respect to the optical axis, and negative when measured in the clockwise direction with respect to the optical axis. $\theta_{HM}$ is calculated by $\theta_{HM} = |\theta_H - \theta_M|$.

As illustrated in FIG. 5, in the DOE 110, all of the grating wall surfaces are negatively inclined relative to the optical axis in such a manner that the inner diameter of the grating wall surface decreases as the grating wall surface comes closer from the first lens 112 to the second lens 113. The DOE 110 satisfies the formula (1). Therefore, as described above with reference to the first exemplary embodiment, the DOE 110 is shaped to facilitate the manufacturing while reducing flare generation. As illustrated in FIG. 5, the DOE 110 is shaped to satisfy the formula (5).

In the DOE 110 according to the present exemplary embodiment, the first diffraction grating is formed of resin ($N_d = 1.566$, $\upsilon_d = 19.0$, and $\theta_{gF} = 0.418$) made of a mixture of acrylic resin and Indium Tin Oxide (ITO) fine particles. $\theta_{gF}$ denotes the partial dispersion ratio and is given by the following formula (6).

$$\theta_{gF} = (N_g - N_F)/(N_F - N_C) \qquad (6)$$

where $N_g$, $N_F$, $N_d$, and $N_C$ are the refractive indices for the Fraunhofer g line, F line, d line, and C line, respectively.

The second diffraction grating is formed of resin ($N_d = 1.619$, $\upsilon_d = 43.2$, and $\theta_{gF} = 0.564$) made of a mixture of acrylic resin and Zirconium Oxide (ZrO2) fine particles. The grating height d is 10.79 μm.

Forming the first and second diffraction gratings by using such materials enables obtaining high diffraction efficiency in a wide wavelength range.

Figure 6:
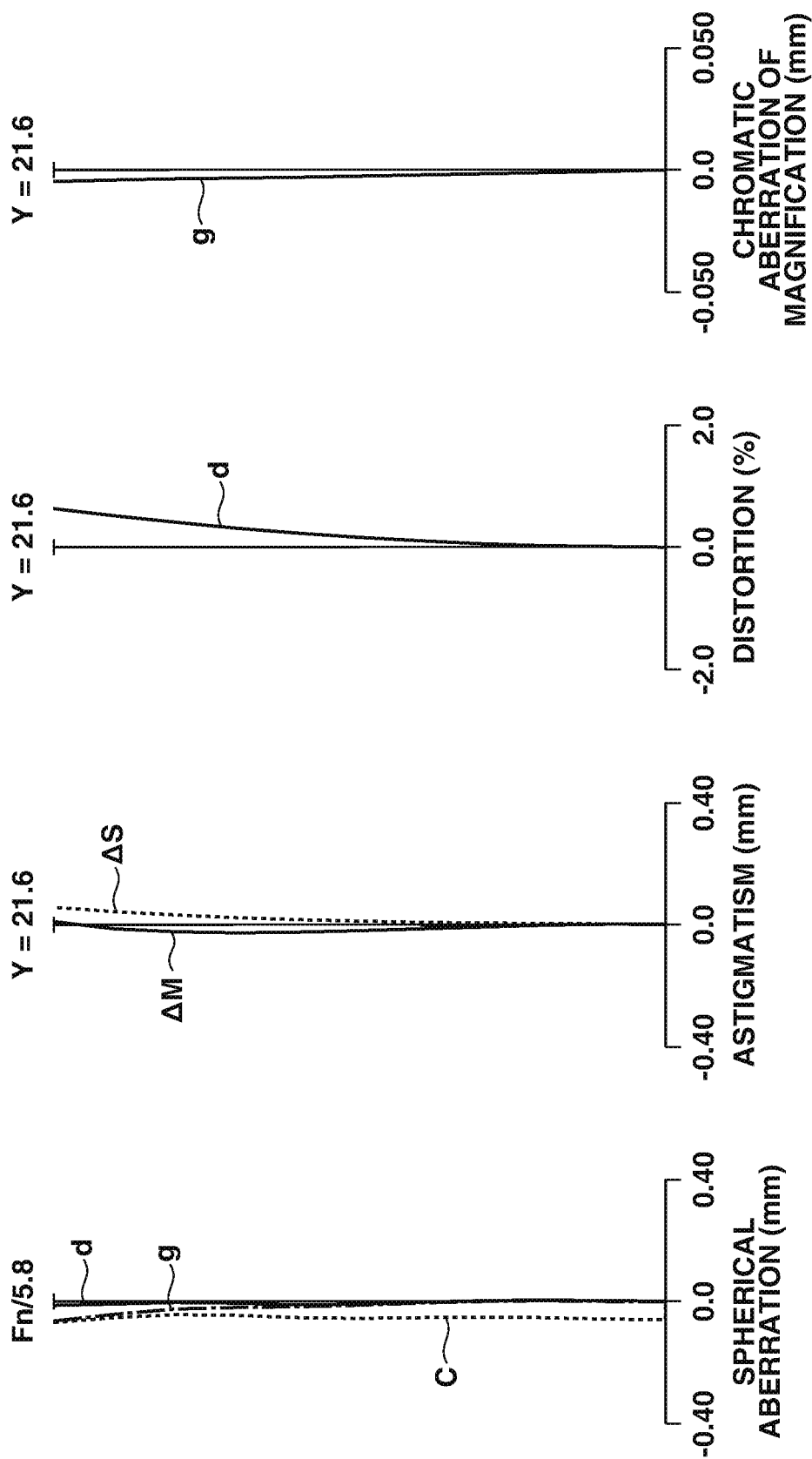
FIG. 6 illustrates aberrations of the optical system according to the second exemplary embodiment in a state of being focused at infinity.

FIG. 6 illustrates aberration charts of the optical system 100 in a state of focusing at infinity. Referring to FIG. 6, lines d, g, and C denote the aberration curves for the Fraunhofer d line, g line, and C line, respectively. Referring to the astigmatism chart, ΔM denotes astigmatism at the meridional image plane, ΔS denotes astigmatism at the sagittal image plane, Y denotes the image height (mm), and Fn denotes the F-number.

As illustrated in FIG. 6, in the optical system 100, aberrations including the chromatic aberration are suitably corrected.

To further improve the effect of correcting the chromatic aberration by the DOE 110, it is desirable to dispose the DOE 110 at a position where a large diameter of the luminous flux of axial ray is provided. Generally, the diameter of the luminous flux of axial ray in a telephoto lens is larger on the object side of the aperture diaphragm SP than on the image side thereof. Therefore, it is more desirable to dispose the DOE 110 on the object side of the aperture diaphragm SP.

The partial optical system composed of all of the lenses disposed on the object side of the DOE 110 has positive refractive power. When the refractive power of the partial optical system disposed on the object side of the DOE 110 is positive, the axial ray will enter the DOE 110 as convergence (convergent) light. This enables reducing the angle formed by the grating wall surface of the DOE 110 and the incident light, making it possible to effectively reduce flare. When only one lens is disposed on the object side of the DOE 110, the lens serves as a partial optical system disposed on the object side of the DOE 110.

It is desirable that the following conditional expression (7) is satisfied.

$$0.10 < L_d/L_t < 0.50 \tag{7}$$

where $L_d$ is the distance on the optical axis from the lens surface of the optical system on the most object side to the lens surface of the first lens 112 on the side where the diffraction grating section 114 is formed, and $L_t$ is the total length of the optical system. $L_t$ is the distance on the optical axis from the lens surface of the optical system on the most object side to the image plane.

Although, as described above, disposing the DOE 110 on the object side of the aperture diaphragm SP enables more effectively correcting the chromatic aberration, light that does not normally reach the image plane (unnecessary light), such as light from the outside of the imaging field angle, is likely to enter the DOE 110. If such unnecessary light that entered the DOE 110 is reflected on the grating wall surface, the unnecessary light reaches the image plane and produces flare. When $L_d$ is small to such an extent that $L_d/L_t$ falls below the lower limit of the formula (7), unnecessary light other than the imaging light is likely to enter the DOE 110, producing flare. On the other hand, when $L_d/L_t$ exceeds the upper limit of the formula (7), the diameter of the luminous flux of axial ray incident on the DOE 110 decreases, making it difficult to sufficiently correct the chromatic aberration. When $L_d/L_t$ exceeds the upper limit of the formula (7), the optical system will increase in size.

It is desirable that the range of the formula (7) is set within the range of the following formula (7a).

$$0.20 < L_d/L_t < 0.45 \tag{7a}$$

It is desirable that the following conditional expression (8) is satisfied.

$$-2.0 < f/(R_d \times Fn) < -0.20 \tag{8}$$

where $R_d$ is the curvature radius of the lens surface of the first lens 112 on the side where the diffraction grating section 114 is formed, f is the focal length of the entire optical system, and Fn is the F-number.

When the absolute value of the curvature of the lens surface of the first lens 112 on the side where the diffraction grating section 114 is formed is large to such an extent that $f/(R_d \times Fn)$ falls below the lower limit of the formula (8), the incident angle of light incident on the diffraction grating section 114 will increase. As a result, the amount of light incident on the grating wall surface will increase, making it difficult to reduce flare.

On the other hand, when the absolute value of the curvature of the lens surface of the first lens 112 on the side where the diffraction grating section 114 is formed is small to such an extent that $f/(R_d \times Fn)$ exceeds the upper limit of the formula (8), it becomes difficult to correct aberrations such as the spherical aberration.

It is desirable that the range of the formula (8) is set within the range of the following formula (8a), more desirably, set within the range of the formula (8b).

$$-1.9 < f/(R_d \times Fn) < -0.30 \tag{8a}$$

$$-1.8 < f/(R_d \times Fn) < -0.41 \tag{8b}$$

Further, it is desirable that the following conditional expression (9) is satisfied.

$$0.6 < (E_1 - E_d)/L_d + E_d \times P_f \cdot E_d/R_d < 2.0 \tag{9}$$

where $E_1$ is the effective diameter of the lens surface of the optical system on the most object side, $E_d$ is the effective diameter of the lens surface of the first lens 112 on the side where the diffraction grating section 114 is formed, and $P_f$ is the refractive power of the lens surface of the first lens 112 on the object side (the lens surface of the first lens 112 on the side where the diffraction grating section 114 is not formed).

The refractive power $P_f$ of the lens surface of the first lens 112 on the object side is given by the following formula (10).

$$P_f = (N_{LL} - 1)/R_{LL} \tag{10}$$

where $R_{LL}$ is the curvature radius of the lens surface of the first lens 112 on the object side.

The angle formed by the axial marginal ray and the optical axis when the axial marginal ray that entered the optical system 100 is incident on the first lens 112 can be approximately represented by $(E_1 - E_d)/(2L_d)$. The angle formed by the travelling directions of the axial marginal ray before and after the axial marginal ray enters the lens surface of the first lens 112 on the object side can be approximately represented by $E_d \times P_f/2$.

The angle formed by the optical axis and the surface normal of the lens surface of the first lens 112 on the side where the diffraction grating section 114 is formed at the incidence position of the axial marginal ray can be represented by $E_d/(2R_d)$. More specifically, the upper and lower limits of the formula (9) correspond to the incident angle of the axial marginal ray incident on the diffraction grating section 114.

When $(E_1 - E_d)/L_d + E_d \times P_f - E_d/R_d$ exceeds the upper limit of the formula (9), the incident angle of the axial marginal ray incident on the diffraction grating section 114 will be too large. As a result, the amount of light incident on the grating wall surface will increase, making it difficult to reduce flare.

When $(E_1 - E_d)/L_d + E_d \times P_f - E_d/R_d$ falls below the lower limit of the formula (9), the refractive power of the lens surface of the first lens 112 on the object side becomes too small, or the aberration correction effect by the DOE 110 cannot sufficiently be acquired. As a result, it becomes difficult to correct aberrations of the entire optical system.

It is desirable that the range of the formula (9) is set within the range of the following formula (9a), more desirably, set within the range of the formula (9b).

$$0.70 < (E_1 - E_d)/L_d + E_d \times P_f - E_d/R_d < 1.8 \tag{9a}$$

$$0.75 < (E_1 - E_d)/L_d + E_d \times P_f - E_d/R_d < 1.7 \tag{9b}$$

It is desirable that the following formula (11) is satisfied.

$$10 \text{ degrees} < |\theta_D| < 57 \text{ degrees} \quad (11)$$

where $\theta_D$ is the incident angle of the axial marginal ray incident on the diffraction grating section 114 when focusing at infinity. The incident angle $\theta_D$ refers to the angle formed by the axial marginal ray and the surface normal of the lens surface of the first lens 112 on the image side at the incidence position where the axial marginal ray is incident on the diffraction grating section 114.

When $|\theta_D|$ exceeds the upper limit of the formula (11), the incident angle of the axial marginal ray incident on the diffraction grating section 114 will be too large. As a result, the amount of light incident on the grating wall surface will increase, making it difficult to reduce flare.

When $|\theta_D|$ falls below the lower limit of the formula (11), the refractive power of the lens surface of the first lens 112 on the object side becomes too small, or the aberration correction effect by the DOE 110 cannot sufficiently be acquired. As a result, it becomes difficult to correct aberrations of the entire optical system.

It is desirable that the range of the formula (11) is set within the range of the following formula (11a), more desirably, set within the range of the formula (11b).

$$15 \text{ degrees} < |\theta_D| < 51 \text{ degrees} \quad (11a)$$

$$20 \text{ degrees} < |\theta_D| < 45 \text{ degrees} \quad (11b)$$

Figure 7:
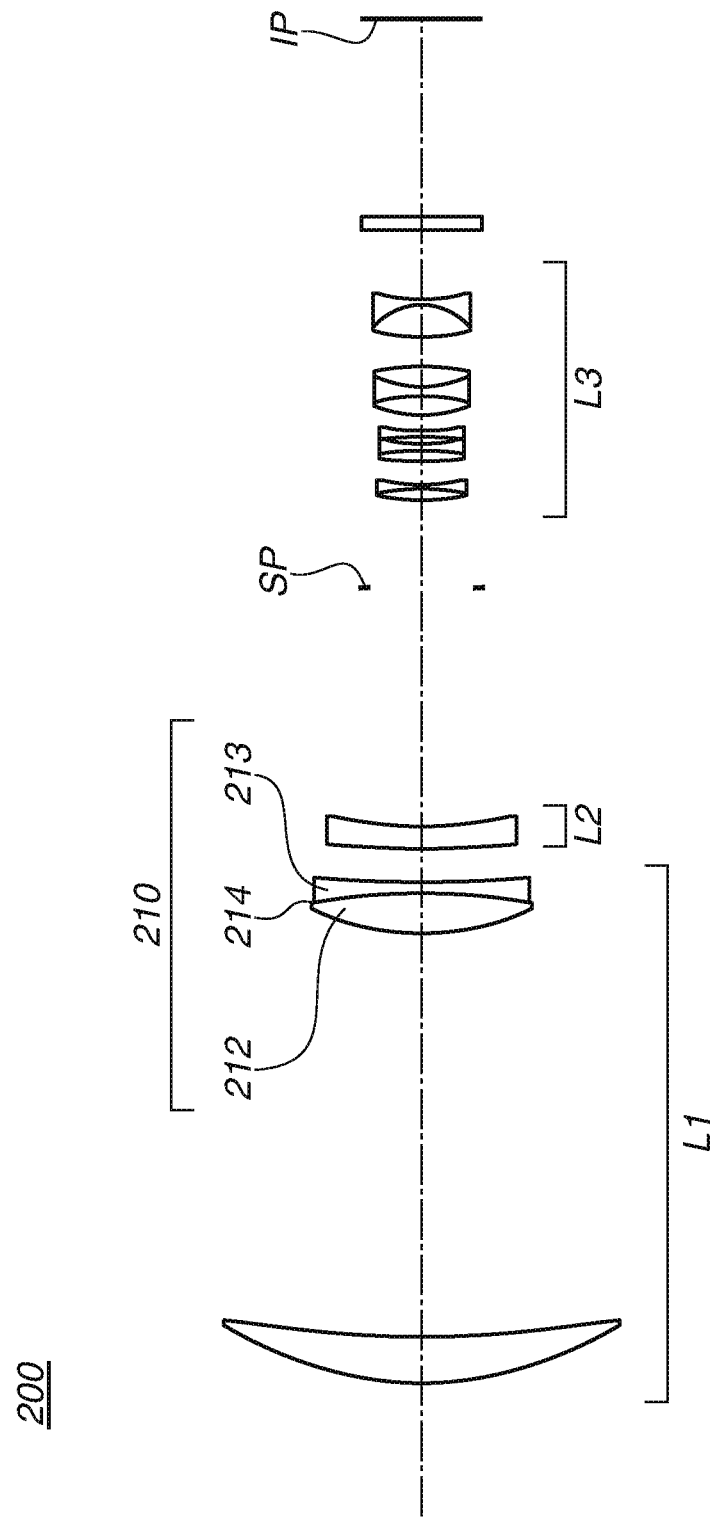
FIG. 7 is a cross-sectional view illustrating an optical system according to a third exemplary embodiment in a state of being focused at infinity.

Next, an optical system according to a third exemplary embodiment will be described. FIG. 7 is a cross-sectional view illustrating an optical system 200 according to the third exemplary embodiment in a state of focusing at infinity. The optical system 200 includes a first lens group L1 having positive refractive power, a second lens group L2 having negative refractive power, an aperture diaphragm SP, and a third lens group L3 having negative refractive power, which are disposed in this order from the object side to the image side. In focusing from infinity to the shortest distance, the second lens group L2 moves to the image side. The first lens group L1 and the third lens group L3 do not move during focusing.

The first lens group L1 includes a DOE 210. As illustrated in FIG. 7, the DOE 210 includes a first lens 212 having a convex surface on the image side, and a second lens 213 having a concave surface on the object side. A diffraction grating section 214 is formed between the first lens 212 and the second lens 213. In the optical system 200, the DOE 210 is disposed in such a manner that the first lens 212 is disposed on the object side of the second lens 213.

The configuration of the diffraction grating section 214 is similar to the configuration of the DOE 10 according to the first exemplary embodiment. More specifically, the diffraction grating section 214 includes a first diffraction grating and a second diffraction grating having a larger refractive index than the first diffraction grating in this order from the first lens 212. The optical power by the diffraction of the diffraction grating section 214 is positive.

Each grating wall surface of the diffraction grating section 214 is inclined relative to the optical axis in such a manner that the inner diameter of the grating wall surface gradually decreases as the grating wall surface comes closer from the first lens 212 to the second lens 213. From another viewpoint, the grating wall surface of the diffraction grating section 214 is inclined to satisfy the formula (1).

Figure 8:
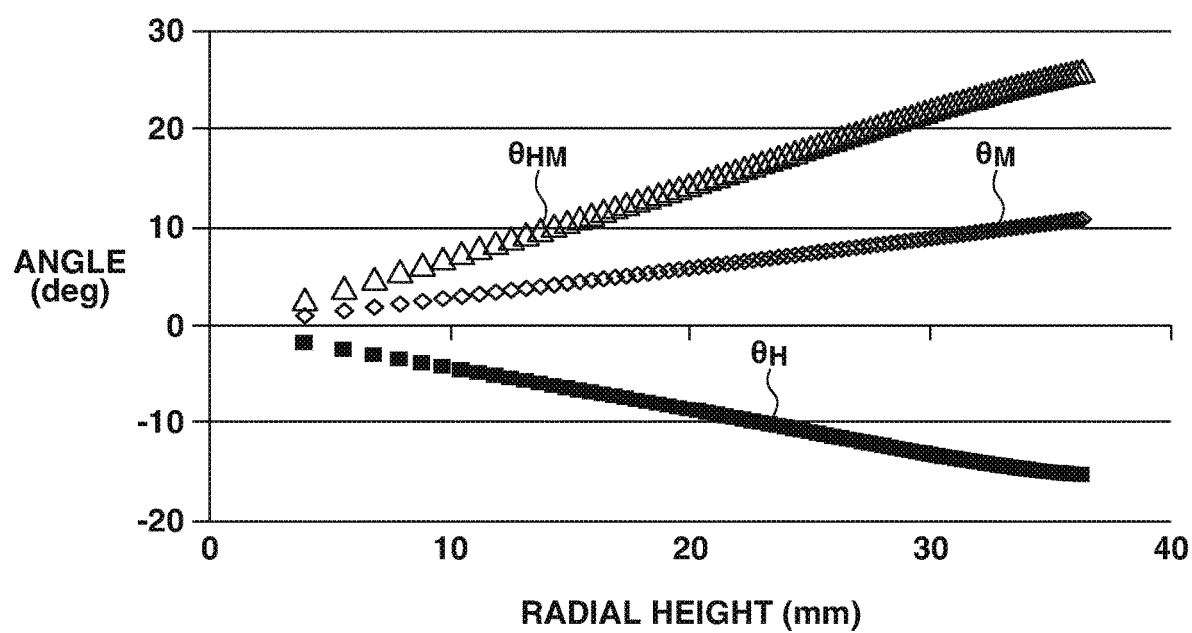
FIG. 8 illustrates $\theta_M$, $\theta_H$, and $\theta_{HM}$ in a diffractive optical element of the optical system according to the third exemplary embodiment.

For each grating wall surface of the diffraction grating section 214 of the DOE 210, relations between the distance from the grating wall surface to the optical axis, and respective $\theta_H$ (degrees), $\theta_M$ (degrees), and $\theta_{HM}$ (degrees) are illustrated in FIG. 8. Referring to the cross-sectional view of the optical system 200 illustrated in FIG. 7, the shape of the diffraction grating section 214 is symmetric with respect to the optical axis. FIG. 8 illustrates the relations only for the upper side of the optical axis.

As illustrated in FIG. 8, in the DOE 210, all of the grating wall surfaces are negatively inclined relative to the optical axis in such a manner that the inner diameter of the grating wall surface decreases as the grating wall surface comes closer from the first lens 212 to the second lens 213. The DOE 210 satisfies the formula (1). Therefore, as described above with reference to the first exemplary embodiment, the DOE 210 is shaped to facilitate the manufacturing while reducing flare generation. Further, as illustrated in FIG. 8, the DOE 210 is shaped to satisfy the formula (5).

In the DOE 210 according to the present exemplary embodiment, the first diffraction grating is formed of a resin material ($N_d$=1.528, $\nu_d$=34.7, and $\theta_{gF}$=0.605).

The second diffraction grating is formed of a resin material ($N_d$=1.557, $\nu_d$=50.2, and $\theta_{gF}$=0.568). The grating height d is 19.9 μm.

Forming the first and the second diffraction gratings by using such materials enables obtaining high diffraction efficiency in a wide wavelength range.

Figure 9:
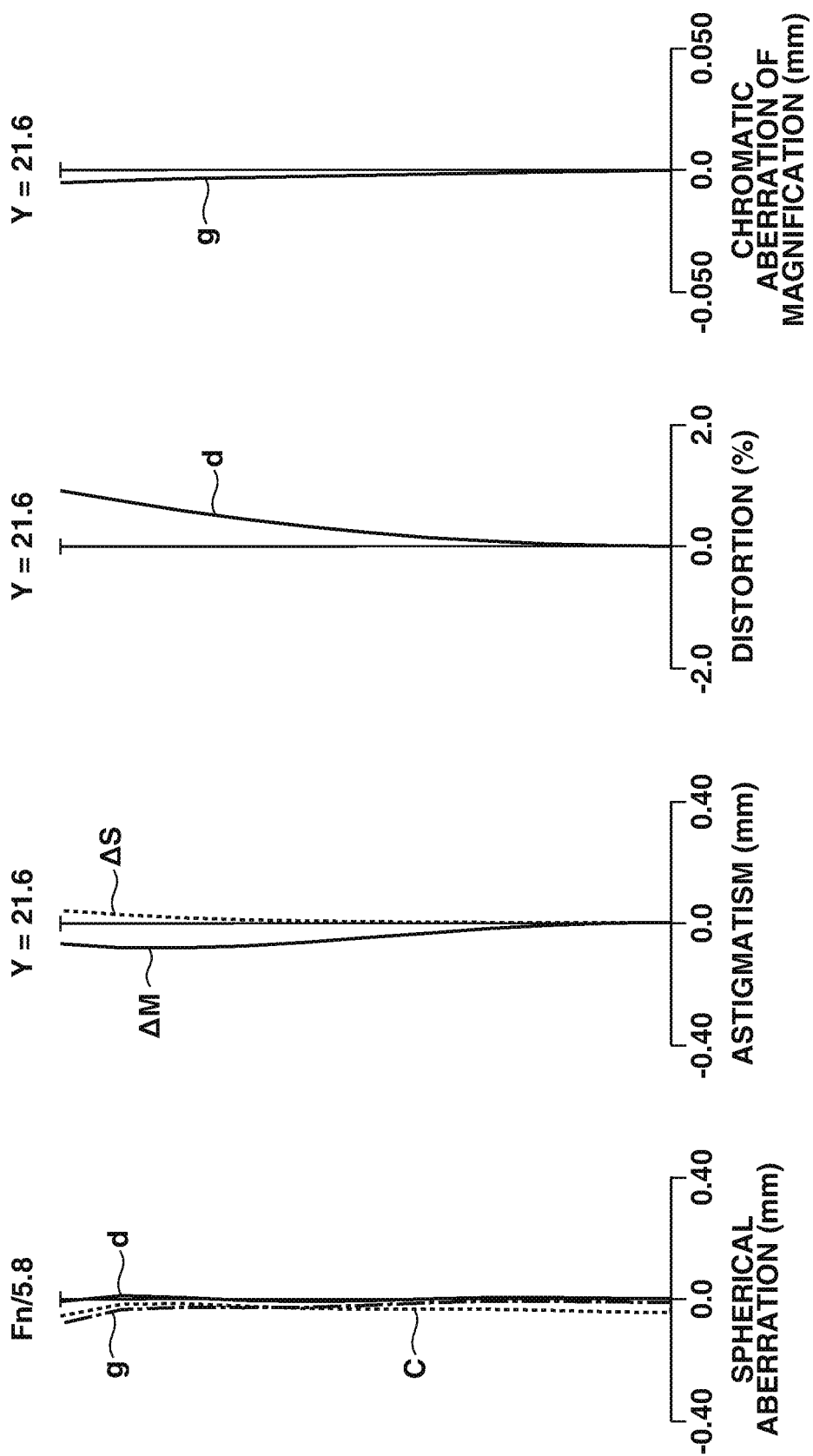
FIG. 9 illustrates aberrations of the optical system according to the third exemplary embodiment in a state of being focused at infinity.

FIG. 9 illustrates aberration charts of the optical system 200 in a state of focusing at infinity. As illustrated in FIG. 9, in the optical system 200, aberrations including the chromatic aberration are suitably corrected.

Figure 10:
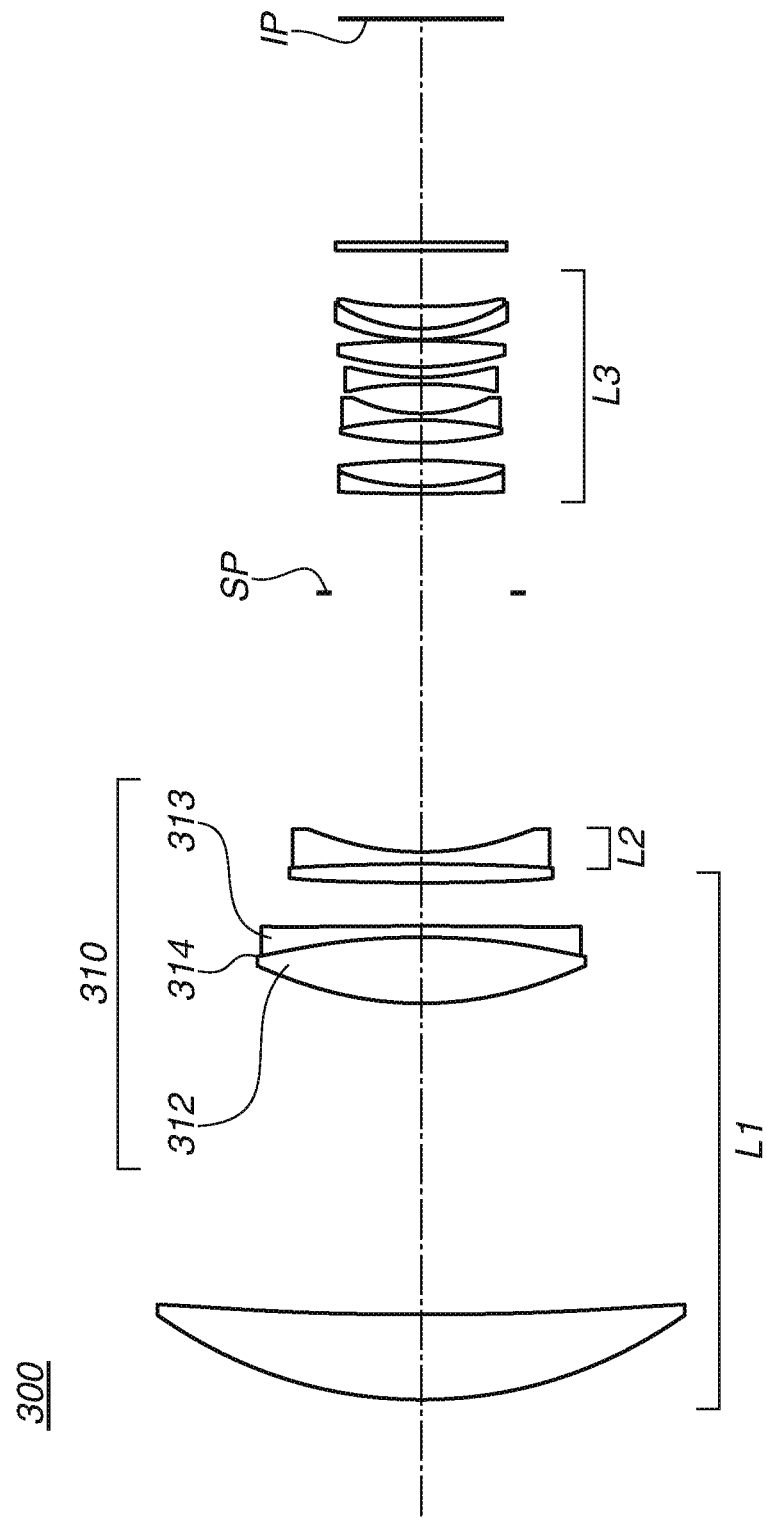
FIG. 10 is a cross-sectional view illustrating an optical system according to a fourth exemplary embodiment when focusing at infinity.

Next, an optical system according to a fourth exemplary embodiment will be described. FIG. 10 is a cross-sectional view illustrating an optical system 300 according to the fourth exemplary embodiment in a state of focusing at infinity. The optical system 300 includes a first lens group L1 having positive refractive power, a second lens group L2 having negative refractive power, an aperture diaphragm SP, and a third lens group L3 having positive refractive power, which are disposed in this order from the object side to the image side. In focusing from infinity to the shortest distance, the second lens group L2 moves to the image side. The first lens group L1 and the third lens group L3 do not move during focusing.

The first lens group L1 includes a DOE 310, As illustrated in FIG. 10, the DOE 310 includes a first lens 312 having a convex surface on the image side, and a second lens 313 having a concave surface on the object side. A diffraction grating section 314 is formed between the first lens 312 and the second lens 313. In the optical system 300, the DOE 310 is disposed in such a manner that the first lens 312 is disposed on the object side of the second lens 313.

The configuration of the diffraction grating section 314 is similar to the configuration of the DOE 10 according to the first exemplary embodiment. More specifically, the diffraction grating section 314 includes a first diffraction grating and a second diffraction grating having a larger refractive index than the first diffraction grating in this order from the first lens 312. The optical power by the diffraction of the diffraction grating section 314 is positive.

Each grating wall surface of the diffraction grating section 314 is inclined relative to the optical axis in such a manner that the inner diameter of the grating wall surface gradually decreases as the grating wall surface comes closer from the first lens 312 to the second lens 313. From another viewpoint, the grating wall surface of the diffraction grating section 314 is inclined to satisfy the formula (1).

Figure 11:
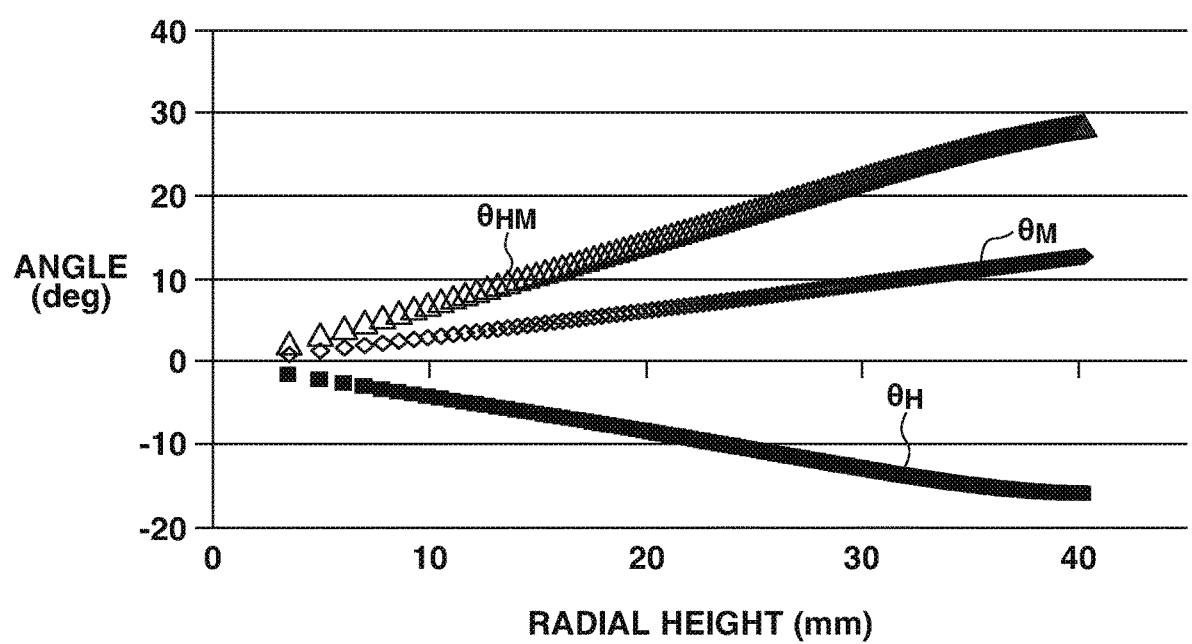
FIG. 11 illustrates $\theta_M$, $\theta_H$, and $\theta_{HM}$ in a diffractive optical element of the optical system according to the fourth exemplary embodiment.

For each grating wall surface of the diffraction grating section 314 of the DOE 310, relations between the distance from the grating wall surface to the optical axis, and respective $\theta_H$ (degrees), $\theta_M$ (degrees), and $\theta_{HM}$ (degrees) are illustrated in FIG. 11. Referring to the cross-sectional view of the optical system 300 illustrated in FIG. 10, the shape of the diffraction grating section 314 is symmetric with respect to the optical axis. FIG. 11 illustrates the relations only for the upper side of the optical axis.

As illustrated in FIG. 11, in the DOE 310, all of the grating wall surfaces are negatively inclined relative to the optical axis in such a manner that the inner diameter of the grating wall surface decreases as the grating wall surface comes closer from the first lens 312 to the second lens 313. From another viewpoint, the DOE 310 satisfies the formula (1). Therefore, as described above with reference to the first exemplary embodiment, the DOE 310 is shaped to facilitate the manufacturing while reducing flare generation. Further, as illustrated in FIG. 11, the DOE 310 is shaped to satisfy the formula (5).

In the DOE 310 according to the present exemplary embodiment, the first diffraction grating is formed of a resin material ($N_d$=1.615, $\upsilon_d$=26.5, and $\theta_{gF}$=0.612).

The second diffraction grating is formed of a resin material ($N_d$=1.643, $\upsilon_d$=38.8, and $\theta_{gF}$=0.578). The grating height d is 21.5 μm.

Forming the first and the second diffraction gratings by using such materials enables obtaining high diffraction efficiency in a wide wavelength range.

Figure 12:
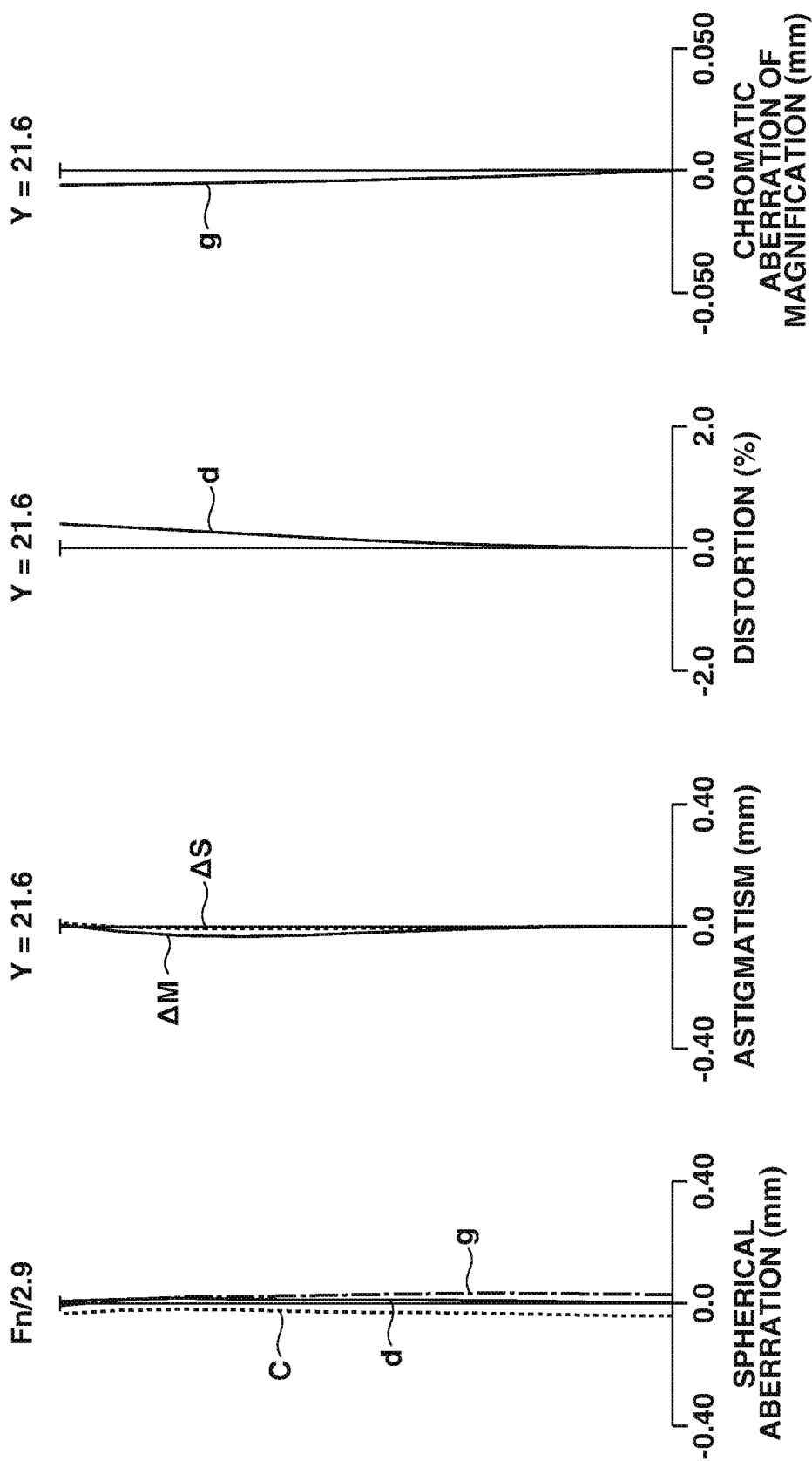
FIG. 12 illustrates aberrations of the optical system of according to the fourth exemplary embodiment in a state of being focused at infinity.

FIG. 12 illustrates aberration charts of the optical system 300 in a state of being focused at infinity. As illustrated in FIG. 12, in the optical system 300, aberrations including the chromatic aberration are suitably corrected.

Figure 13:
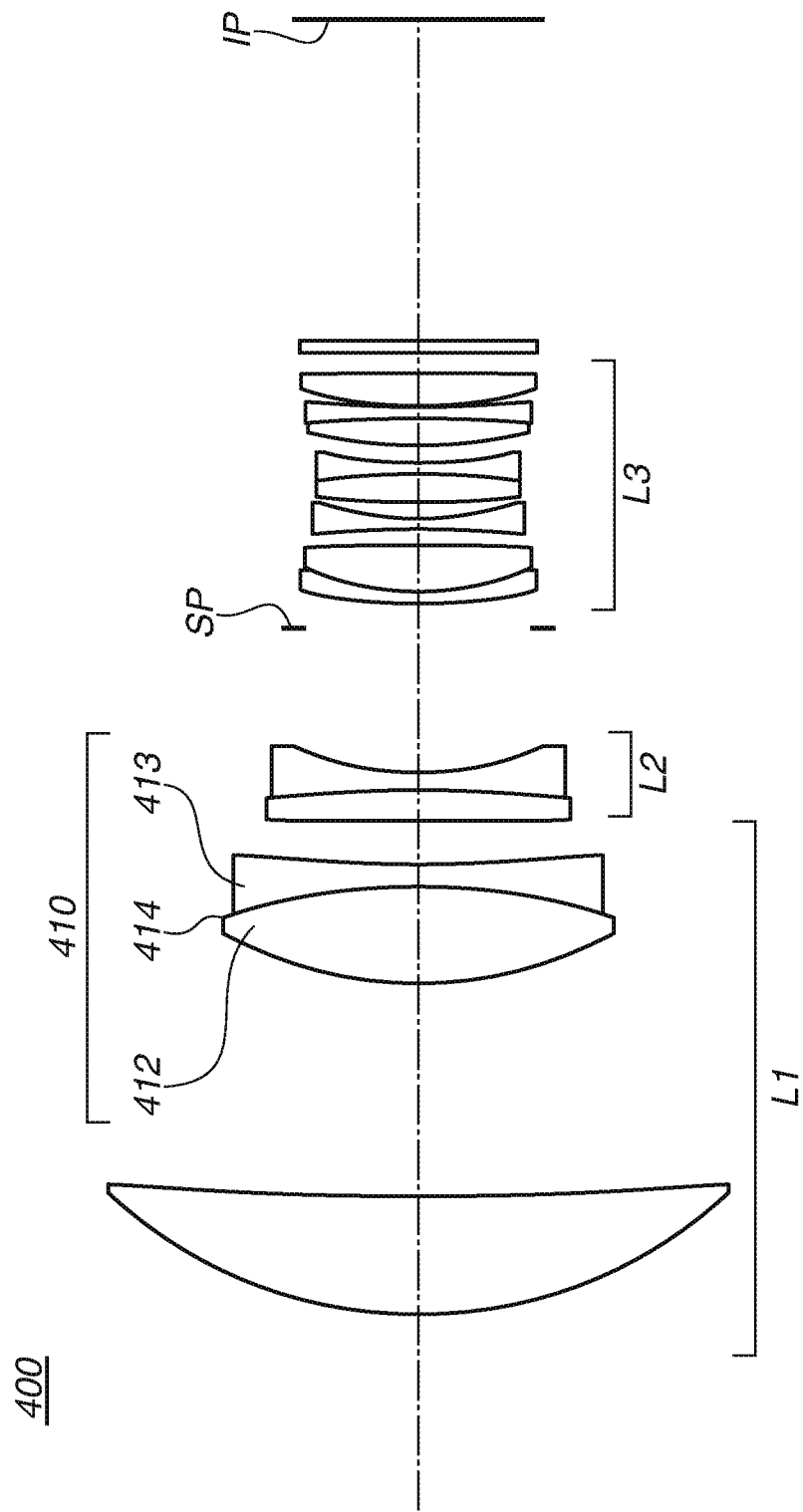
FIG. 13 is a cross-sectional view illustrating an optical system according to a fifth exemplary embodiment in a state of being focused at infinity.

Next, an optical system according to a fifth exemplary embodiment will be described. FIG. 13 is a cross-sectional view illustrating an optical system 400 according to the fifth exemplary embodiment in a state of being focused at infinity. The optical system 400 includes a first lens group L1 having positive refractive power, a second lens group L2 having negative refractive power, an aperture diaphragm SP, and a third lens group L3 having positive refractive power, which are disposed in this order from the object side to the image side. In focusing from infinity to the shortest distance, the second lens group L2 moves to the image side. The first lens group L1 and the third lens group L3 do not move during focusing.

The first lens group L1 includes a DOE 410. As illustrated in FIG. 13, the DOE 410 includes a first lens 412 having a convex surface on the image side, and a second lens 413 having a concave surface on the object side. A diffraction grating section 414 is formed between the first lens 412 and the second lens 413. In the optical system 400, the DOE 410 is disposed in such a manner that the first lens 412 is disposed on the object side of the second lens 413.

The configuration of the diffraction grating section 414 is similar to the configuration of the DOE 10 according to the first exemplary embodiment. More specifically, the diffraction grating section 414 includes a first diffraction grating and a second diffraction grating having a larger refractive index than the first diffraction grating in this order from the first lens 412. The optical power by the diffraction of the diffraction grating section 414 is positive.

Each grating wall surface of the diffraction grating section 414 is inclined relative to the optical axis in such a manner that the inner diameter of the grating wall surface gradually decreases as the grating wall surface comes closer from the first lens 412 to the second lens 413. From another viewpoint, the grating wall surface of the diffraction grating section 414 is inclined to satisfy the formula (1).

Figure 14:
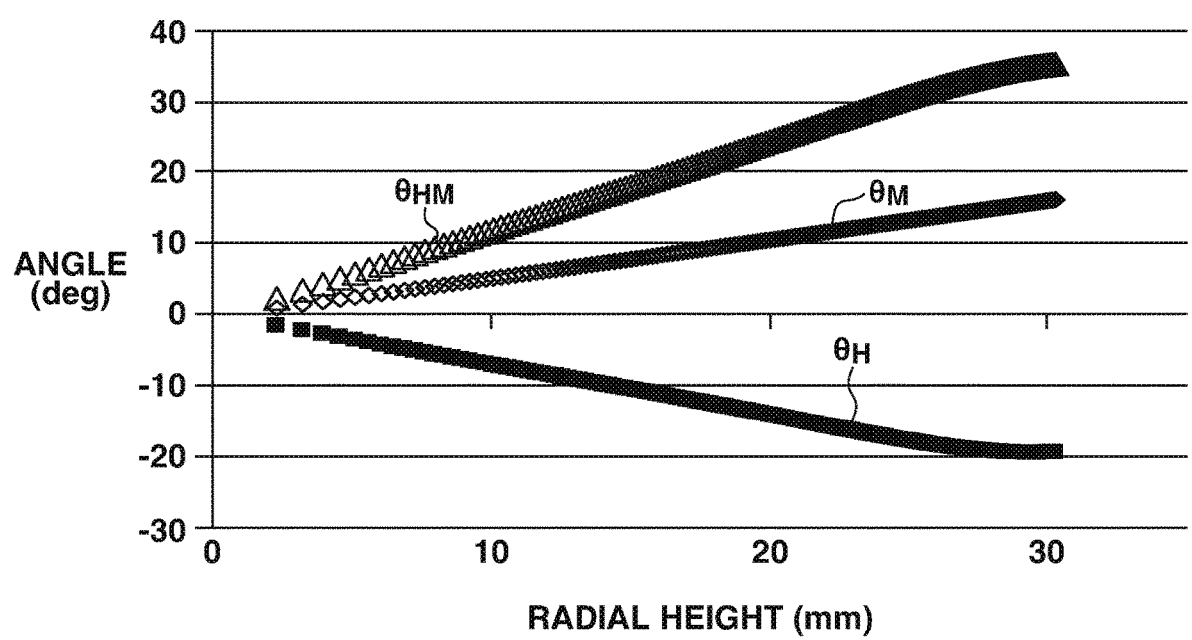
FIG. 14 illustrates $\theta_M$, $\theta_H$, and $\theta_{HM}$ in a diffractive optical element of the optical system according to the fifth exemplary embodiment.

For each grating wall surface of the diffraction grating section 414 of the DOE 410, relations between the distance from the grating wall surface to the optical axis, and respective $\theta_H$ (degrees), $\theta_M$ (degrees), and $\theta_{HM}$ (degrees) are illustrated in FIG. 14. Referring to the cross-sectional view of the optical system 400 illustrated in FIG. 13, the shape of the diffraction grating section 414 is symmetric with respect to the optical axis. FIG. 14 illustrates the relations only for the upper side of the optical axis.

As illustrated in FIG. 14, in the DOE 410, all of the grating wall surfaces are negatively inclined relative to the optical axis in such a manner that the inner diameter of the grating wall surface decreases as the grating wall surface comes closer from the first lens 412 to the second lens 413. The DOE 410 satisfies the formula (1). Therefore, as described above with reference to the first exemplary embodiment, the DOE 410 is shaped to facilitate the manufacturing while reducing flare generation. Further, as illustrated in FIG. 14, the DOE 410 is shaped to satisfy the formula (5).

In the DOE 410 according to the present exemplary embodiment, the first diffraction grating is formed of resin ($N_d$=1.566, $\upsilon_d$=19.0, and $\theta_{gF}$=0.418) made of a mixture of acrylic resin and ITO fine particles.

The second diffraction grating is formed of resin ($N_d$=1.619, $\upsilon_d$=43.2, and $\theta_{gF}$=0.564) made of a mixture of acrylic resin and ZrO2 fine particles. The grating height d is 10.79 μm.

Forming the first and the second diffraction gratings by using such materials enables obtaining high diffraction efficiency in a wide wavelength range.

Figure 15:
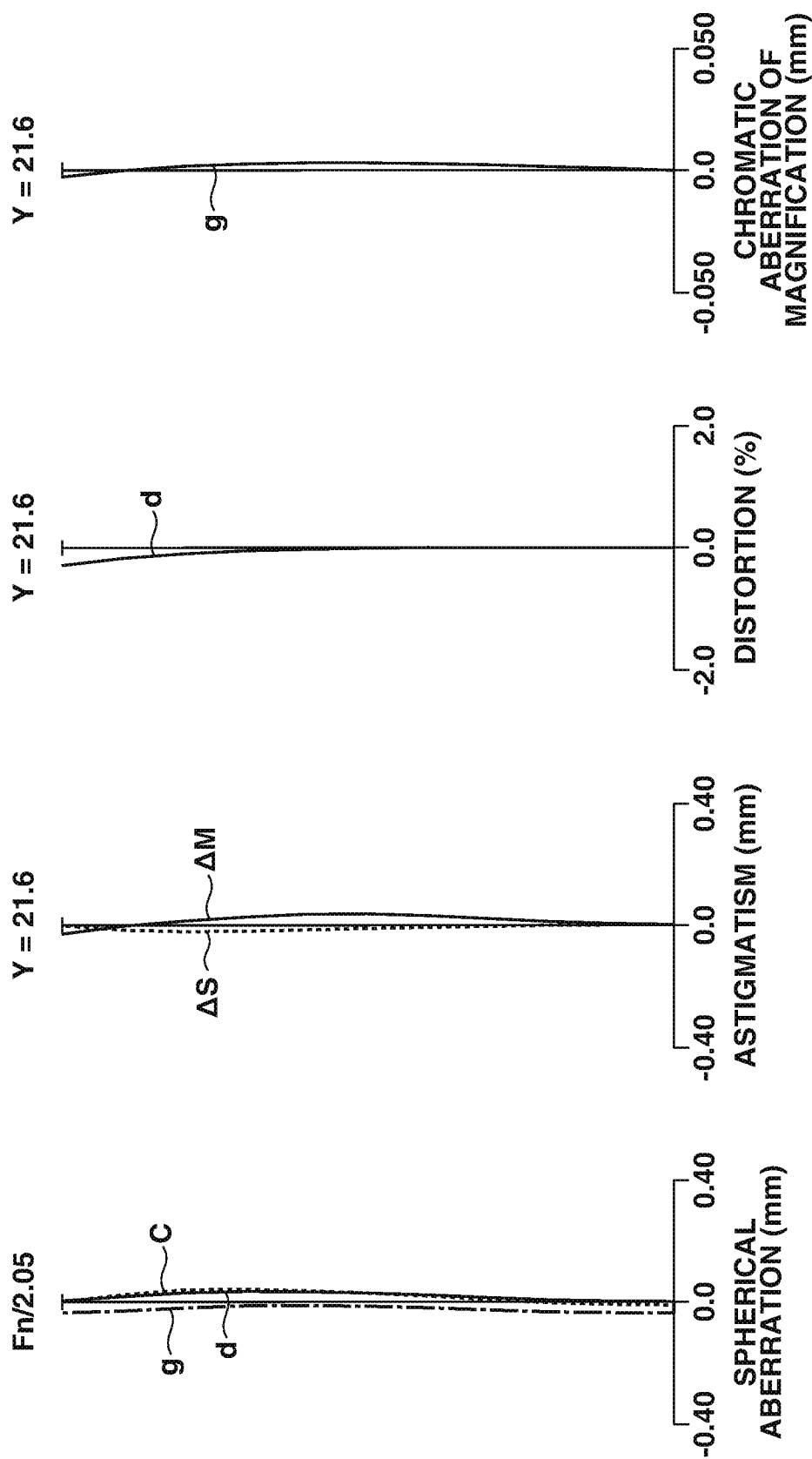
FIG. 15 illustrates aberrations of the optical system according to the fifth exemplary embodiment in a state of being focused at infinity.

FIG. 15 illustrates aberration charts of the optical system 400 in a state of being focused at infinity. As illustrated in FIG. 15, in the optical system 400, aberrations including the chromatic aberration are suitably corrected.

Figure 16:
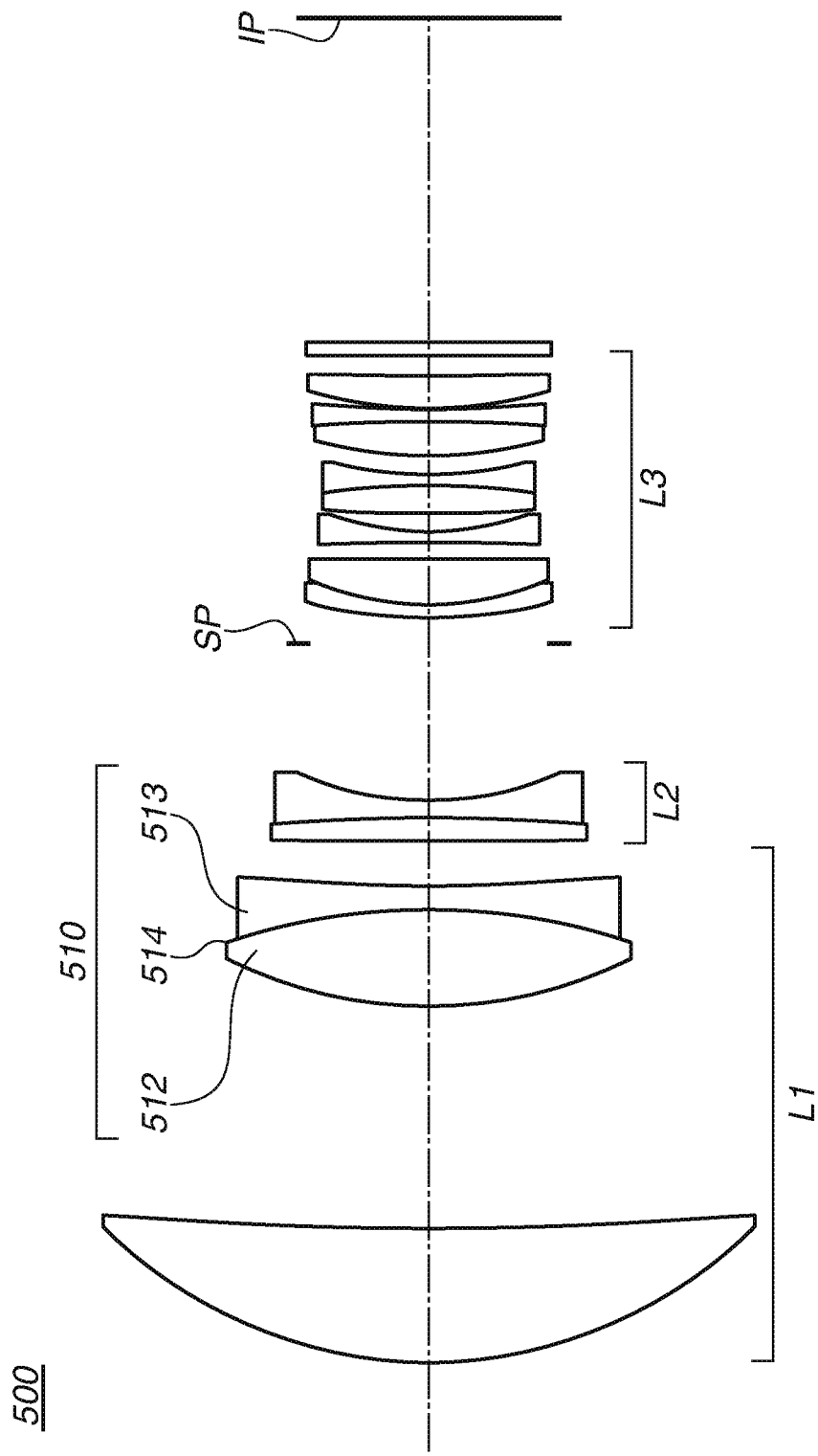
FIG. 16 is a cross-sectional view illustrating an optical system according to a sixth exemplary embodiment in a state of being focused at infinity.

Next, an optical system according to a sixth exemplary embodiment will be described. FIG. 16 is a cross-sectional view illustrating an optical system 500 according to the sixth exemplary embodiment in a state of being focused at infinity. The optical system 500 includes a first lens group L1 having positive refractive power, a second lens group L2 having negative refractive power, an aperture diaphragm SP, and a third lens group L3 having positive refractive power, which are disposed in this order from the object side to the image side. In focusing from infinity to the shortest distance, the second lens group L2 moves to the image side. The first lens group L1 and the third lens group L3 do not move during focusing.

The first lens group L1 includes a DOE 510. As illustrated in FIG. 16, the DOE 510 includes a first lens 512 having a convex surface on the image side, and a second lens 513 having a concave surface on the object side. A diffraction grating section 514 is formed between the first lens 512 and the second lens 513. In the optical system 500, the DOE 510 is disposed in such a manner that the first lens 512 is disposed on the object side of the second lens 513.

The configuration of the diffraction grating section 514 is similar to the configuration of the DOE 10 according to the first exemplary embodiment. More specifically, the diffraction grating section 514 includes a first diffraction grating and a second diffraction grating having a larger refractive index than the first diffraction grating in this order from the first lens 512. The optical power by the diffraction of the diffraction grating section 514 is positive.

Each grating wall surface of the diffraction grating section 514 is inclined relative to the optical axis in such a manner that the inner diameter of the grating wall surface gradually decreases as the grating wall surface comes closer from the first lens 512 to the second lens 513. From another viewpoint, the grating wall surface of the diffraction grating section 514 is inclined to satisfy the formula (1).

Figure 17:
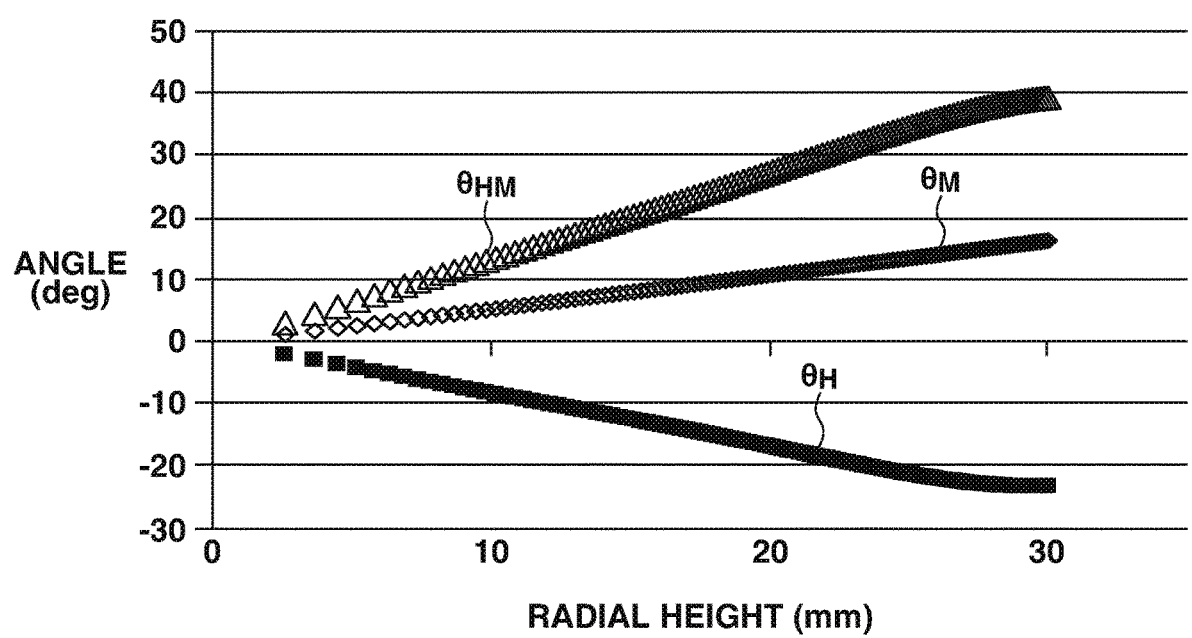
FIG. 17 illustrates $\theta_M$, $\theta_H$, and $\theta_{HM}$ in a diffractive optical element of the optical system according to the sixth exemplary embodiment.

For each grating wall surface of the diffraction grating section 514 of the DOE 510, relations between the distance from the grating wall surface to the optical axis, and respective $\theta_H$ (degrees), $\theta_M$ (degrees), and $\theta_{HM}$ (degrees) are illustrated in FIG. 17. Referring to the cross-sectional view of the optical system 500 illustrated in FIG. 16, the shape of the diffraction grating section 514 is symmetric with respect to the optical axis. FIG. 17 illustrates the relations only for the upper side of the optical axis.

As illustrated in FIG. 17, in the DOE 510, all of the grating wall surfaces are negatively inclined relative to the optical axis in such a manner that the inner diameter of the grating wall surface decreases as the grating wall surface comes closer from the first lens 512 to the second lens 513. The DOE 510 satisfies the formula (1). Therefore, as described above with reference to the first exemplary embodiment, the DOE 510 is shaped to facilitate the manufacturing while reducing flare generation. Further, as illustrated in FIG. 17, the DOE 510 is shaped to satisfy the formula (5).

In the DOE 510 according to the present exemplary embodiment, the first diffraction grating is formed of resin ($N_d$=1.480, $\upsilon_d$=21.7, and $\theta_{gF}$=0.383) made of a mixture of fluororesin and ITO fine particles.

The second diffraction grating is formed of a resin material ($N_d$=1.524, $\upsilon_d$=51.6, and $\theta_{gF}$=0.562). The grating height d is 12.95 μm.

Forming the first and the second diffraction gratings by using such materials enables obtaining high diffraction efficiency in a wide wavelength range.

Figure 18:
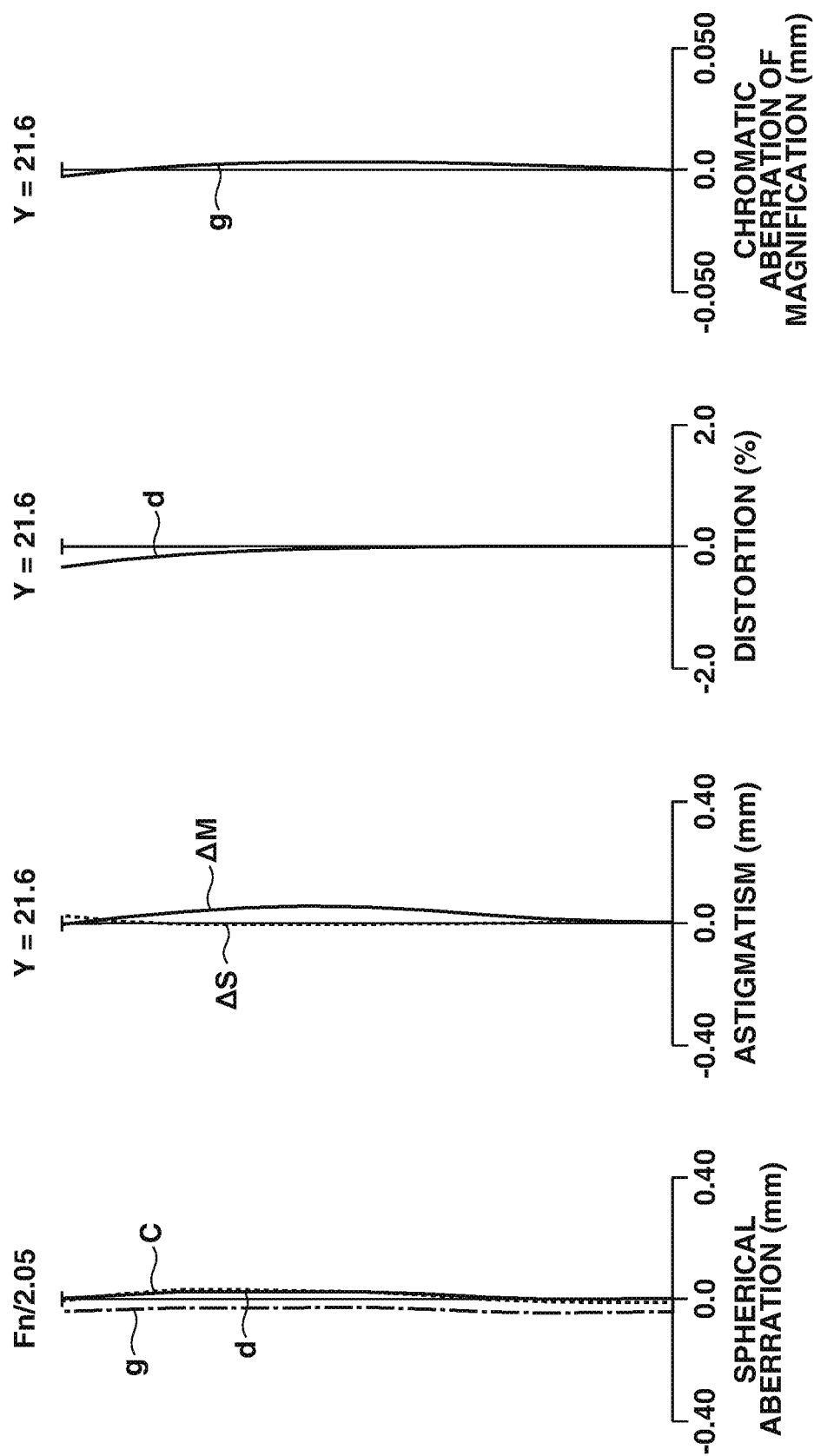
FIG. 18 illustrates aberrations of the optical system according to the sixth exemplary embodiment in a state of being focused at infinity.

FIG. 18 illustrates aberration charts of the optical system 500 in a state of being focused at infinity. As illustrated in FIG. 18, in the optical system 500, aberrations including the chromatic aberration are suitably corrected.

The first to the fifth numerical examples corresponding to the optical systems 100 to 500 according to the second to the sixth exemplary embodiments, are shown below.

In the surface data according to each numerical example, r denotes the curvature radius of each optical surface, and d (mm) denotes the on-axis interval (distance on the optical axis) between the m-th and the (m+1)-th surfaces, where m is the surface number of the optical system counted from the light incident side, nd is the refractive index of the d line of each optical member, and $\upsilon_d$ is the Abbe number for the d line of the optical member.

"e±B" in aspherical surface data and diffractive surface data means "$10^{\pm B}$". The aspherical surface shape of the optical surface is represented by the following formula (12) where X is the amount of displacement from the surface vertex in the optical axis direction, H is the height from the optical axis in the direction perpendicular to the optical axis direction, R is the paraxial curvature radius, k is the conic constant, and $A_4$, $A_6$, $A_8$, $A_{10}$, $A_{12}$, and $A_{14}$ are aspheric surface coefficients.

$$x(h) = \frac{(1/r)h^2}{1+\sqrt{\{1-(1+k)(h/r)^2\}}} + \quad (12)$$
$$A_4h^4 + A_6h^6 + A_8h^8 + A_{10}h^{10} + A_{12}h^{12} + A_{14}h^{14}$$

In each numerical example, the values of d, focal length (mm), F-number, and half-field angle (degrees) are values when the optical system according to each exemplary embodiment is focused on an object at infinity. A back focus BF is the distance from the last lens surface to the image plane. The total lens length is the sum of the distance from the first lens surface to the last lens surface and the value of the back focus BF.

A phase shape ψ of the diffractive surface of the diffractive optical element according to each numerical example is represented by the following formula (13).

$$\psi(h,m)=(2\pi/m\lambda 0)(C_2 h^2+C_4 h^4+C_6 h^6 \ldots) \quad (13)$$

Referring to the formula (13), h is the height from the optical axis, λ0 is the design wavelength, m is the diffraction order, and $C_i$ (i=2, 4, 6 . . . ) is the phase coefficient.

In this case, the power $\varphi_D$ of the diffraction grating for an arbitrary wavelengths λ and an arbitrary diffraction order m can be represented by the following formula (14), where $C_2$ is the lowest order phase coefficient.

$$\varphi_D(\lambda,m)=-2C_2 m\lambda/\lambda 0 \quad (14)$$

According to each numerical example, for each diffraction grating constituting the diffractive optical element, the diffraction order m is 1, and the design wavelength λ0 is the wavelength of the d line (587.56 nm).

First Numerical Example

Unit (mm)

Surface data

| Surface No. | r | d | nd | νd | Effective diameter |
|---|---|---|---|---|---|
| 1 (Aspherical surface) | 139.485 | 16.40 | 1.4875 | 70.2 | 134.48 |
| 2 | 600.728 | 144.94 | | | 133.46 |
| 3 (Aspherical surface) | 85.670 | 13.09 | 1.4970 | 81.5 | 72.94 |
| 4 | −320.403 | 0.002 | 1.5660 | 19.0 | 71.19 |
| 5 (Diffractive surface) | −320.403 | 0.05 | 1.6199 | 43.2 | 71.18 |
| 6 | −320.403 | 3.50 | 2.0033 | 28.3 | 71.16 |
| 7 | 648.053 | 2.88 | | | 68.88 |
| 8 | 679.319 | 2.34 | 1.8081 | 22.8 | 67.15 |
| 9 | 584.762 | 3.20 | 1.8348 | 42.7 | 66.22 |
| 10 (Aspherical surface) | 134.826 | 86.48 | | | 63.93 |
| 11 (Diaphragm) | ∞ | 34.82 | | | 40.14 |
| 12 | 76.077 | 4.06 | 1.8081 | 22.8 | 29.69 |
| 13 | −67.737 | 1.50 | 1.8348 | 42.7 | 29.36 |
| 14 | 69.304 | 9.24 | | | 27.89 |
| 15 | 142.465 | 3.69 | 1.8467 | 23.9 | 27.97 |
| 16 | −94.529 | 2.50 | 1.6056 | 43.7 | 27.80 |
| 17 | 64.379 | 2.50 | | | 27.11 |
| 18 | −132.204 | 2.00 | 1.8040 | 46.6 | 27.12 |
| 19 | 78.220 | 5.70 | | | 27.56 |
| 20 (Aspherical surface) | 44.962 | 6.66 | 1.7380 | 32.3 | 31.33 |
| 21 | −65.436 | 0.40 | | | 31.24 |
| 22 | −57.768 | 3.00 | 1.8929 | 20.4 | 31.17 |
| 23 | 40.092 | 7.40 | 1.6134 | 44.3 | 31.43 |
| 24 | −80.410 | 9.15 | | | 31.92 |
| 25 | 62.000 | 11.57 | 1.5673 | 42.8 | 32.68 |
| 26 | −22.748 | 2.00 | 1.5952 | 67.7 | 32.26 |
| 27 | 61.925 | 25.00 | | | 30.99 |
| 28 | ∞ | 4.40 | 1.5163 | 64.1 | 33.73 |
| 29 | ∞ | 77.59 | | | 34.07 |
| 30 | ∞ | | | | |

-continued

| Unit (mm) |
|---|

Aspherical surface data

First surface k = −1.42907E−02
$A_4$ = −2.35660E−09
$A_6$ = −2.78502E−13
$A_8$ = −3.73974E−18
$A_{10}$ = −1.71054E−21
$A_{12}$ = −1.71054E−21

Third surface k = −1.88438E+00
$A_4$ = 3.08070E−07
$A_6$ = −9.77306E−13
$A_8$ = −3.56770E−15
$A_{10}$ = 1.58909E−18
$A_{12}$ = −4.86078E−22

Tenth surface k = −2.05982E+00
$A_4$ = 8.09083E−08
$A_6$ = 5.54689E−12
$A_8$ = −3.18893E−15
$A_{10}$ = 4.15591E−19

Twentieth surface k = 1.19638E+00
$A_4$ = −1.76591E−06
$A_6$ = −8.99919E−10
$A_8$ = 7.80397E−13
$A_{10}$ = 8.35620E−17

Diffractive surface data
Fifth surface $C_2$ = −4.03065E−05
$C_4$ = 2.26824E−09
$C_6$ = −9.56622E−13

Various data

| | |
|---|---|
| Focal length | 780.0 |
| F-number | 5.80 |
| Half-field angle (degrees) | 1.6 |
| Image height | 21.6 |
| Total lens length | 486.06 |
| BF | 77.59 |

Lens group data

| Group | Starting surface | Focal length |
|---|---|---|
| 1 | 1 | 224.5 |
| 2 | 8 | −202.7 |
| 3 | 12 | −200.0 |

Second Numerical Example

| Unit (mm) | | | | | |
|---|---|---|---|---|---|
| Surface No. | r | d | nd | vd | Effective diameter |
| 1 (Aspherical surface) | 125.499 | 16.25 | 1.4875 | 70.2 | 134.48 |
| 2 | 371.022 | 143.96 | | | 133.34 |
| 3 (Aspherical surface) | 87.614 | 14.70 | 1.497 | 81.5 | 74.01 |
| 4 | −190.068 | 0.05 | 1.5276 | 34.7 | 72.22 |
| 5 (Diffractive surface) | −190.068 | 0.05 | 1.5569 | 50.2 | 72.19 |
| 6 | −190.068 | 3.50 | 1.9108 | 35.3 | 72.17 |
| 7 | 427.093 | 11.90 | | | 69.30 |
| 8 | 344.680 | 8.00 | 1.8830 | 40.8 | 63.16 |
| 9 (Aspherical surface) | 140.097 | 84.85 | | | 59.69 |
| 10 (Diaphragm) | ∞ | 31.74 | | | 36.31 |
| 11 | 98.207 | 3.53 | 1.8081 | 22.8 | 28.10 |
| 12 | −64.390 | 1.50 | 1.8348 | 42.7 | 27.96 |
| 13 | 76.509 | 9.24 | | | 27.39 |
| 14 | 3660.189 | 3.67 | 1.8467 | 23.9 | 27.88 |
| 15 | −59.545 | 2.50 | 1.6056 | 43.7 | 27.94 |
| 16 | 140.542 | 1.77 | | | 27.75 |
| 17 | −133.850 | 2.00 | 1.8040 | 46.6 | 27.77 |
| 18 | 78.158 | 5.70 | | | 28.27 |
| 19 (Aspherical surface) | 47.721 | 6.64 | 1.7380 | 32.3 | 32.25 |
| 20 | −69.436 | 0.40 | | | 32.23 |
| 21 | −58.607 | 3.00 | 1.8929 | 20.4 | 32.21 |
| 22 | 48.545 | 7.61 | 1.6134 | 44.3 | 32.80 |
| 23 | −65.327 | 10.00 | | | 33.35 |
| 24 | 64.850 | 11.75 | 1.5673 | 42.8 | 33.7 |
| 25 | −23.631 | 2.00 | 1.5952 | 67.7 | 33.23 |
| 26 | 57.876 | 25.00 | | | 31.71 |
| 27 | ∞ | 4.40 | 1.5163 | 64.1 | 34.46 |
| 28 | ∞ | 70.34 | | | 34.81 |
| 29 (Image surface) | ∞ | | | | |

Aspherical surface data

First surface k = −1.42907E−02
$A_4$ = −2.35660E−09
$A_6$ = −2.78502E−13
$A_8$ = −3.73974E−18
$A_{10}$ = −1.71054E−21
$A_{12}$ = −1.71054E−21

Third surface k = −1.88438E+00
$A_4$ = 3.08070E−07
$A_6$ = −9.77306E−13
$A_8$ = −3.56770E−15
$A_{10}$ = 1.58909E−18
$A_{12}$ = −4.86078E−22

Ninth surface k = −2.05982E+00
$A_4$ = 8.09083E−08
$A_6$ = 5.54689E−12
$A_8$ = −3.18893E−15
$A_{10}$ = 4.15591E−19

Nineteenth surface k = 1.19638E+00
$A_4$ = −1.76591E−06
$A_6$ = −8.99919E−10
$A_8$ = 7.80397E−13
$A_{10}$ = 8.35620E−17

Diffractive surface data
Fifth surface $C_2$ = −4.03065E−05
$C_4$ = 2.26824E−09
$C_6$ = −9.56622E−13

Various data

| | |
|---|---|
| Focal length | 780.0 |
| F-number | 5.80 |
| Half-field angle (degrees) | 1.6 |
| Image height | 21.6 |
| Total lens length | 486.05 |
| BF | 70.34 |

Lens group data

| Group | Starting surface | Focal length |
|---|---|---|

-continued

Unit (mm)

| | | |
|---|---|---|
| 1 | 1 | 268.4 |
| 2 | 8 | −272.3 |
| 3 | 11 | −204.5 |

Third Numerical Example

Unit (mm)

| Surface No. | r | d | nd | vd | Effective diameter |
|---|---|---|---|---|---|
| 1 (Aspherical surface) | 119.357 | 22.64 | 1.4875 | 70.2 | 134.48 |
| 2 | 763.342 | 83.12 | | | 132.44 |
| 3 (Aspherical surface) | 92.232 | 17.81 | 1.4970 | 81.5 | 82.94 |
| 4 | −179.273 | 0.05 | 1.6151 | 26.5 | 80.36 |
| 5 (Diffractive surface) | −179.273 | 0.05 | 1.6431 | 38.8 | 80.35 |
| 6 | −179.273 | 2.95 | 1.8503 | 32.3 | 80.32 |
| 7 | −2248.283 | 11.49 | | | 77.26 |
| 8 | 515.704 | 5.13 | 1.8081 | 22.8 | 65.99 |
| 9 | −509.658 | 3.20 | 1.8830 | 40.8 | 64.40 |
| 10 (Aspherical surface) | 78.038 | 69.22 | | | 59.43 |
| 11 (Diaphragm) | ∞ | 26.48 | | | 46.26 |
| 12 | 461.982 | 1.80 | 1.8081 | 22.8 | 40.66 |
| 13 | 57.130 | 7.10 | 1.7570 | 47.8 | 40.40 |
| 14 | −148.092 | 4.62 | | | 40.54 |
| 15 | 84.730 | 6.11 | 1.8467 | 23.9 | 39.79 |
| 16 | −105.171 | 1.70 | 1.6056 | 43.7 | 39.28 |
| 17 | 39.636 | 7.85 | | | 36.33 |
| 18 | −90.783 | 1.80 | 1.8040 | 46.6 | 36.34 |
| 19 | 69.793 | 2.85 | | | 37.50 |
| 20 (Aspherical surface) | 72.730 | 7.03 | 1.7380 | 32.3 | 40.31 |
| 21 | −225.107 | 0.20 | | | 41.03 |
| 22 | 55.025 | 3.00 | 1.8467 | 23.9 | 42.35 |
| 23 | 40.048 | 5.86 | 1.6134 | 44.3 | 41.24 |
| 24 | 115.630 | 15.00 | | | 41.01 |
| 25 | ∞ | 2.20 | 1.5163 | 64.1 | 41.41 |
| 26 | ∞ | 59.79 | | | 41.45 |
| 27 (Image surface) | ∞ | | | | |

Aspherical surface data

First surface k = −3.23271E−01
$A_4$ = 2.49708E−08
$A_6$ = 1.09496E−12
$A_8$ = 3.71896E−17
$A_{10}$ = 7.60080E−21

Third surface k = −3.13925E+00
$A_4$ = 3.75224E−07
$A_6$ = −5.06005E−11
$A_8$ = 4.11091E−15
$A_{10}$ = −8.01472E−19
$A_{12}$ = −1.03023E−22

Tenth surface k = −9.30267E−02
$A_4$ = 4.40544E−08
$A_6$ = 1.08005E−11
$A_8$ = 3.85360E−15
$A_{10}$ = −1.69391E−18

Twentieth surface k = 8.04214E−01
$A_4$ = −5.78950E−07
$A_6$ = −1.51948E−10
$A_8$ = −9.75920E−14
$A_{10}$ = 5.87507E−17

Diffractive surface data

-continued

Unit (mm)

Fifth surface $C_2$ = −4.81608E−05
$C_4$ = 2.48823E−09
$C_6$ = −7.84815E−13

Various data

| | |
|---|---|
| Focal length | 390.0 |
| F-number | 2.90 |
| Half-field angle (degrees) | 3.2 |
| Image height | 21.6 |
| Total lens length | 369.07 |
| BF | 59.79 |

Lens group data

| Group | Starting surface | Focal length |
|---|---|---|
| 1 | 1 | 163.2 |
| 2 | 8 | −101.9 |
| 3 | 12 | 345.2 |

Fourth Numerical Example

Unit (mm)

| Surface No. | r | d | nd | vd | Effective diameter |
|---|---|---|---|---|---|
| 1 (Aspherical surface) | 79.068 | 20.71 | 1.4875 | 70.2 | 102.86 |
| 2 | 643.847 | 37.00 | | | 100.65 |
| 3 (Aspherical surface) | 64.836 | 16.86 | 1.4875 | 70.2 | 63.99 |
| 4 | −106.833 | 0.002 | 1.5660 | 19.0 | 60.48 |
| 5 (Diffractive surface) | −106.833 | 0.05 | 1.6190 | 43.2 | 60.47 |
| 6 | −106.833 | 3.95 | 1.6727 | 32.1 | 60.43 |
| 7 | 267.129 | 7.51 | | | 54.81 |
| 8 | 3209.381 | 5.34 | 1.8081 | 22.8 | 49.50 |
| 9 | −251.490 | 3.00 | 1.7292 | 54.7 | 47.63 |
| 10 | 52.944 | 25.10 | | | 43.36 |
| 11 (Diaphragm) | ∞ | 4.44 | | | 39.22 |
| 12 (Aspherical surface) | 100.674 | 2.10 | 1.8081 | 22.8 | 37.93 |
| 13 | 47.692 | 8.03 | 1.7725 | 49.6 | 36.74 |
| 14 | −577.611 | 2.89 | | | 35.51 |
| 15 | −160.477 | 1.75 | 1.6968 | 55.5 | 34.15 |
| 16 | 50.108 | 2.99 | | | 32.80 |
| 17 | 195.498 | 4.88 | 1.8467 | 23.8 | 32.84 |
| 18 | −122.150 | 1.80 | 1.5407 | 47.2 | 32.69 |
| 19 | 71.436 | 3.12 | | | 32.16 |
| 20 | 81.909 | 4.69 | 1.7200 | 43.7 | 34.92 |
| 21 | −246.705 | 2.00 | 1.8081 | 22.8 | 35.50 |
| 22 | 188.446 | 0.20 | | | 36.42 |
| 23 | 70.535 | 5.76 | 1.8830 | 40.8 | 37.67 |
| 24 | −1243.51 | 3.40 | | | 37.86 |
| 25 | ∞ | 2.20 | 1.5163 | 64.1 | 38.18 |
| 26 | ∞ | 56.05 | | | 38.30 |
| 27 (Image surface) | ∞ | | | | |

Aspherical surface data

First surface k = 2.94671E−01
$A_4$ = −2.65433E−08
$A_6$ = −1.12941E−11
$A_8$ = −1.23216E−15
$A_{10}$ = −9.03682E−19
$A_{12}$ = 2.64633E−22
$A_{14}$ = −8.68831E−26

-continued

Unit (mm)

Third surface k = 0.00000E+00
$A_4$ = −4.13485E−07
$A_6$ = −1.01773E−10
$A_8$ = −4.09820E−14
$A_{10}$ = −1.35393E−16
$A_{12}$ = 1.46462E−19
Twelfth surface k = 2.40879E+00
$A_4$ = 8.23477E−07
$A_6$ = −1.07278E−09
$A_8$ = 7.33823E−12
$A_{10}$ = −1.88191E−14
$A_{12}$ = 1.75521E−17
Diffractive surface data
Fifth surface $C_2$ = −1.13342E−04
$C_4$ = 3.23399E−08
$C_6$ = −1.50255E−11

Various data

| Focal length | 195.9 |
|---|---|
| F-number | 2.05 |
| Half-field angle (degrees) | 6.3 |
| Image height | 21.6 |
| Total lens length | 225.84 |
| BF | 56.05 |

Lens group data

| Group | Starting surface | Focal length |
|---|---|---|
| 1 | 1 | 117.5 |
| 2 | 8 | −75.9 |
| 3 | 12 | 122.8 |

Fifth Numerical Example

Unit (mm)

| Surface No. | r | d | nd | vd | Effective diameter |
|---|---|---|---|---|---|
| 1 (Aspherical surface) | 76.590 | 22.07 | 1.4875 | 70.2 | 103.11 |
| 2 | 577.345 | 37.00 | | | 100.30 |
| 3 (Aspherical surface) | 68.307 | 16.10 | 1.5378 | 74.7 | 63.32 |
| 4 | −104.952 | 0.005 | 1.4799 | 21.7 | 59.94 |
| 5 (Diffractive surface) | −104.952 | 0.05 | 1.5242 | 51.6 | 59.93 |
| 6 | −104.952 | 3.95 | 1.7380 | 32.3 | 59.88 |
| 7 | 261.364 | 7.51 | | | 54.37 |
| 8 | 4389.915 | 3.76 | 1.8929 | 20.4 | 49.07 |
| 9 | −357.754 | 3.00 | 1.7292 | 54.7 | 47.81 |
| 10 | 52.588 | 26.13 | | | 43.63 |
| 11 (Diaphragm) | ∞ | 4.44 | | | 39.33 |
| 12 (Aspherical surface) | 81.722 | 2.10 | 1.8081 | 22.8 | 37.97 |
| 13 | 47.021 | 7.57 | 1.7725 | 49.6 | 36.76 |
| 14 | 1282.624 | 2.89 | | | 35.41 |
| 15 | −386.649 | 1.75 | 1.6968 | 55.5 | 33.98 |
| 16 | 47.511 | 2.97 | | | 32.47 |
| 17 | 230.898 | 4.72 | 1.8467 | 23.8 | 32.46 |
| 18 | −120.061 | 1.80 | 1.5407 | 47.2 | 32.24 |
| 19 | 62.398 | 3.12 | | | 31.54 |
| 20 | 71.396 | 5.78 | 1.7200 | 43.7 | 34.36 |
| 21 | −260.885 | 2.00 | 1.8081 | 22.8 | 35.11 |
| 22 | 187.059 | 0.20 | | | 35.93 |
| 23 | 67.544 | 5.42 | 1.8830 | 40.8 | 37.13 |
| 24 | 745.89 | 3.40 | | | 37.22 |

-continued

Unit (mm)

| 25 | ∞ | 2.20 | 1.5163 | 64.1 | 37.55 |
|---|---|---|---|---|---|
| 26 | ∞ | 54.00 | | | 37.70 |
| 27 (Image surface) | ∞ | | | | |

Aspherical surface data

First surface k = 2.62030E−01
$A_4$ = −3.96383E−08
$A_6$ = −1.15385E−11
$A_8$ = −1.45058E−15
$A_{10}$ = −1.53259E−18
$A_{12}$ = 5.53728E−22
$A_{14}$ = −1.45712E−25
Third surface k = 0.00000E+00
$A_4$ = −3.77246E−07
$A_6$ = −1.31037E−10
$A_8$ = 5.75632E−14
$A_{10}$ = −2.71228E−16
$A_{12}$ = 2.43543E−19
$A_{14}$ = −8.48835E−23
Twelfth surface k = 7.32909E−01
$A_4$ = 9.05629E−07
$A_6$ = −1.17485E−09
$A_8$ = 7.56204E−12
$A_{10}$ = −1.88342E−14
$A_{12}$ = 1.72746E−17
Diffractive surface data
Fifth surface $C_2$ = −8.84624E−05
$C_4$ = 3.09506E−08
$C_6$ = −1.63650E−11

Various data

| Focal length | 196.4 |
|---|---|
| F-number | 2.05 |
| Half-field angle (degrees) | 6.3 |
| Image height | 21.6 |
| Total lens length | 223.96 |
| BF | 54.00 |

Lens group data

| Group | Starting surface | Focal length |
|---|---|---|
| 1 | 1 | 117.5 |
| 2 | 8 | −75.9 |
| 3 | 12 | 125.6 |

Various numerical values in the optical systems according to the second to the sixth exemplary embodiments are summarized in Table 1.

TABLE 1

| Conditional expression | Exemplary embodiments | | | | |
|---|---|---|---|---|---|
| | Second | Third | Fourth | Fifth | Sixth |
| $v_{LL}$ | 81.5 | 81.5 | 81.5 | 70.2 | 74.7 |
| $v_{LR}$ | 28.3 | 35.3 | 32.3 | 32.1 | 32.3 |
| Formula (3) | 53.3 | 46.3 | 49.3 | 38.1 | 42.4 |
| $N_L$ | 1.5660 | 1.5276 | 1.6151 | 1.5660 | 1.4799 |
| $N_{LL}$ | 1.4970 | 1.4970 | 1.4970 | 1.4875 | 1.5378 |
| Formula (4) | 1.046 | 1.020 | 1.079 | 1.053 | 0.962 |
| Formula (5) | 18.9 | 23.3 | 26.2 | 33.0 | 36.3 |
| $L_d$ | 174.44 | 174.90 | 123.57 | 74.57 | 75.17 |
| $L_t$ | 486.06 | 486.05 | 369.07 | 225.84 | 223.96 |
| Formula (7) | 0.36 | 0.36 | 0.33 | 0.33 | 0.34 |

TABLE 1-continued

| Conditional expression | Exemplary embodiments | | | | |
|---|---|---|---|---|---|
| | Second | Third | Fourth | Fifth | Sixth |
| f | 780.00 | 780.00 | 390.00 | 195.90 | 196.40 |
| $F_n$ | 5.80 | 5.80 | 2.90 | 2.05 | 2.05 |
| $R_d$ | −320.403 | −190.068 | −179.273 | −106.833 | −104.952 |
| Formula (8) | −0.420 | −0.708 | −0.750 | −0.894 | −0.913 |
| Formula (9) | 0.998 | 1.146 | 1.319 | 1.589 | 1.617 |
| $|\theta_D|$ | 22.17 | 26.69 | 31.30 | 37.01 | 37.09 |

[Optical Apparatuses]

Figure 19:
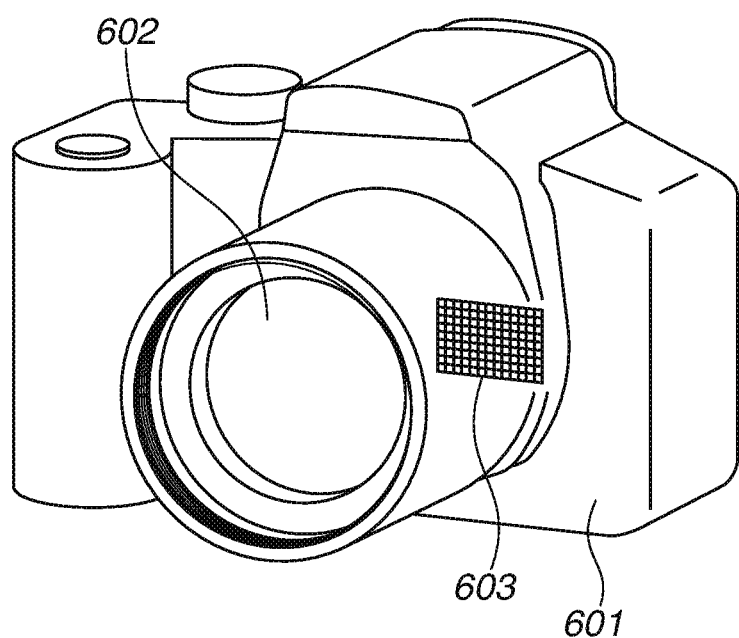
FIG. 19 is a schematic view illustrating an imaging apparatus.

FIG. 19 is a schematic view illustrating an imaging apparatus (digital still camera) 600 according to an exemplary embodiment of the present invention. The imaging apparatus 600 according to the present exemplary embodiment includes a camera main body 601, an optical system 602 similar to the optical system according to any one of the second to the sixth exemplary embodiments, and a light receiving element (image sensor) 603 for performing photoelectric conversion on an image formed by the optical system 602.

Since the imaging apparatus 600 according to the present exemplary embodiment includes the optical system 602 similar to the optical system according to any one of the second to the sixth exemplary embodiments, a high-definition image in which flare caused by a grating wall surface of a DOE is reduced. As the light receiving element 603, such an image sensor as a CCD sensor and CMOS sensor can be used.

The above-described optical system according to each exemplary embodiment is applicable not only to a digital still camera illustrated in FIG. 19 but also to various types of optical apparatuses such as silver-halide film cameras, video cameras, and telescopes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-213545, filed Oct. 31, 2016, which is hereby incorporated by reference herein in its entirety.

What is claimed is:

1. A An optical system comprising a diffractive optical element, wherein the diffractive optical element comprises, in an order from an object side to an image side:
   a first lens having a convex surface;
   a diffraction grating section having positive optical power through diffraction; and
   a second lens having a concave surface facing the convex surface,
   wherein the diffraction grating section includes a first diffraction grating and a second diffraction grating disposed in this order from the object side to the image side, the second diffraction grating having a larger refractive index than the first diffraction grating,
   wherein the diffraction grating section has a plurality of grating surfaces that contributes to the diffraction and a plurality of grating wall surfaces that is adjacent to the plurality of grating surfaces, and
   wherein an inner diameter of a first grating wall surface of the first diffraction grating among the plurality of grating wall surfaces decreases from the object side to the image side.

2. The optical system according to claim 1, wherein the first lens is a positive lens.

3. The optical system according to claim 1, wherein the second lens is a negative lens.

4. The optical system according to claim 1, wherein the following conditional expression is satisfied:

$$20 < v_{LL} - v_{LR} < 60$$

where $v_{LL}$ is an Abbe number of the first lens, and $v_{LR}$ is an Abbe number of the second lens.

5. The optical system according to claim 1, wherein the following conditional expression is satisfied:

$$0.8 < N_L/N_{LL} < 1.2$$

where $N_{LL}$ is a refractive index of the first lens, and $N_L$ is a refractive index of the first diffraction grating.

6. The optical system according to claim 1, wherein the following conditional expression is satisfied:

$$5 \text{ degrees} < \Delta\theta_{HM} < 45 \text{ degrees}$$

where $\Delta\theta_{HM}$ is a difference between maximum and minimum values of an angle $\theta_{HM}$ in the diffraction grating section, $\theta_{HM}$ being defined as an absolute value of an angle formed by each of the grating wall surfaces and a surface normal to an enveloping surface of the diffraction grating section, formed by connecting apical portions of the first diffraction grating, at positions where each of the plurality of grating wall surfaces contacts the enveloping surface.

7. The optical system according to claim 1, wherein at least one of the first and the second diffraction gratings is formed of resin.

8. The optical system according to claim 1, further comprising: an aperture diaphragm disposed on an image side of the optical element.

9. The optical system according to claim 1, further comprising:
   a partial optical system including lenses disposed on the object side of the diffractive optical element,
   wherein the partial optical system has positive refractive power.

10. The optical system according to claim 1, wherein the following conditional expression is satisfied:

$$0.10 < L_d/L_t < 0.50$$

where $L_d$ is a distance on the optical axis from a lens surface of the first lens on a side where the diffraction grating section is formed to a lens surface of the optical system on the most object side, and $L_t$ is a total length of the optical system.

11. The optical system according to claim 1, wherein the following conditional expression is satisfied:

$$-2.0 < f/(R_d \times Fn) < -0.20$$

where f is a focal length of the optical system, Fn is an open F-number of the optical system, and $R_d$ is a curvature radius of a lens surface of the first lens on a side where the diffraction grating section is formed.

12. The optical system according to claim 1, wherein the following conditional expression is satisfied:

$$0.6 < (E_1 - E_d)/L_d + E_d \times P_f - E_d/R_d < 2.0$$

where $E_1$ is an effective diameter of a lens surface of the optical system on the most object side, $E_d$ is an effective diameter of a lens surface of the first lens on a side where the diffraction grating section is formed, $L_d$ is a distance on the optical axis from the lens surface of the first lens on the side where the diffraction grating section is formed to the lens surface of the optical system on the most object side, $R_d$ is a curvature radius of the lens surface of the first lens on the side where the diffraction grating section is formed, and $P_f$ is refracting power of a lens surface of the first lens on a side where the diffraction grating section is not formed.

13. The optical system according to claim 1, wherein the following conditional expression is satisfied:

$$10 \text{ degrees} < |\theta_D| < 57 \text{ degrees}$$

where $\theta_D$ is an incident angle of an axial marginal ray incident on the diffraction grating section in a state of being focused at infinity.

14. An imaging apparatus comprising:
the optical system according to claim 1; and
an image sensor configured to receive light of an image formed by the optical system.

* * * * *